(12) United States Patent
Gifford et al.

(10) Patent No.: US 10,831,827 B2
(45) Date of Patent: Nov. 10, 2020

(54) AUTOMATIC EXTRACTION OF USER MOBILITY BEHAVIORS AND INTERACTION PREFERENCES USING SPATIO-TEMPORAL DATA

(71) Applicant: International Business Machines Corporation, Armonk, NY (US)

(72) Inventors: Wesley M. Gifford, Ridgefield, CT (US); Ying Li, Mohegan Lake, NY (US); Rong Liu, Sterling, VA (US); Anshul Sheopuri, Teaneck, NJ (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 15/088,227

(22) Filed: Apr. 1, 2016

(65) Prior Publication Data

US 2017/0286845 A1 Oct. 5, 2017

(51) Int. Cl.
*G06F 16/901* (2019.01)
*G06N 20/00* (2019.01)
*G06Q 30/02* (2012.01)

(52) U.S. Cl.
CPC ........ *G06F 16/9024* (2019.01); *G06N 20/00* (2019.01); *G06Q 30/02* (2013.01)

(58) Field of Classification Search
CPC .. G06F 17/30958; G06N 99/005; G06N 5/02; G06N 5/022; G06N 5/04; G06N 5/048; G06N 3/02; G06N 3/126; G06N 7/02; G06Q 30/02; H04L 67/22
See application file for complete search history.

(56) References Cited

U.S. PATENT DOCUMENTS

| 8,073,460 | B1 * | 12/2011 | Scofield | H04W 4/21 455/456.1 |
|---|---|---|---|---|
| 8,229,470 | B1 | 7/2012 | Ranjan et al. | |
| 8,521,593 | B2 | 8/2013 | Gadhia et al. | |
| 8,626,818 | B2 | 1/2014 | Suresh | |
| 2010/0131443 | A1 | 5/2010 | Agarwal et al. | |
| 2011/0071881 | A1 | 3/2011 | Zheng et al. | |

(Continued)

FOREIGN PATENT DOCUMENTS

WO WO2014209570 A1 12/2014

OTHER PUBLICATIONS

Lin, Mao et al., Mining GPS data for mobility patterns: A survey, Jun. 2014, Science Direct, Pervasive and Mobile Computing vol. 12, pp. 1-16 (Year: 2013).*

(Continued)

*Primary Examiner* — Kamran Afshar
*Assistant Examiner* — Mashall L Werner
(74) *Attorney, Agent, or Firm* — Scully, Scott, Murphy & Presser, P.C.; Joseph Petrokaitis

(57) ABSTRACT

A user trajectory graph may be constructed based on spatio-temporal data. A mobility pattern may be extracted from the user trajectory graph. Users may be clustered into groups, wherein the users in a same group possess similar feature values in the mobility pattern, and the users in different groups have different feature values, to identify personas and location sets. A distribution model may be constructed that models user timing and location preference, wherein an outcome indicates a preference for a particular time bin on a particular day for a particular location.

20 Claims, 21 Drawing Sheets

(56) References Cited

U.S. PATENT DOCUMENTS

| | | | |
|---|---|---|---|
| 2012/0197732 | A1 | 8/2012 | Shen et al. |
| 2012/0209709 | A1 | 8/2012 | Ramer et al. |
| 2013/0218683 | A1 | 8/2013 | Hannan |
| 2013/0226856 | A1 | 8/2013 | Zhang et al. |
| 2014/0229278 | A1 | 8/2014 | Cohen et al. |
| 2016/0359685 | A1* | 12/2016 | Yadav .................. H04L 41/16 |

OTHER PUBLICATIONS

Yan, Tingxin et al., Fast App Launching for Mobile Devices Using Predictive User Context, Jun. 2012, MobiSys '12 Proceedings of the 10th International Conference on Mobile Systems, Applications and Services, pp. 113-126 (Year: 2012).*

Windhalm, Peter et al., Discovering urban activity patters in cell phone data, Mar. 2015, Springer, Transportation vol. 42 Issue 4, pp. 597-623 (Year: 2015).*

Bayir, Murat A. et al, Discovering Spatio Temporal Mobility Profiles of Cellphone Users, Jun. 2009, 2009 IEEE International Symposium on a World of Wireless, Mobile and Multimedia Networks & Workshops (Year: 2009).*

Lin, Mao et al., Mining GPS data for mobility patterns: A survey, Jun. 2014, Science Direct, Pervasive and Mobile Computing vol. 12, pp. 1-16, 2013. (Year: 2013).*

Yan, Tingxin et al., Fast App Launching for Mobile Devices Using Predictive User Context, Jun. 2012, MobiSys '12 Proceedings of the 10th International Conference on Mobile Systems, Applications and Services, pp. 113-126, 2012. (Year: 2012).*

Windhalm, Peter et al., Discovering urban activity patters in cell phone data, Mar. 2015, Springer, Transportation vol. 42 Issue 4, pp. 597-623, 2015. (Year: 2015).*

Huang et al., Predicting Mobile Application Usage Using Context Information, UbiComp '12, Sep. 2012, pp. 1059-1065, 2012. (Year: 2012).*

Snelder et al., Delays Cause by Incidents: Data-Driven Approach, Journal of the Transportation Research Board, No. 2333, pp. 1-8, 2013. (Year: 2013).*

Yadav et al., U.S. Appl. No. 62/171,044, U.S. Appl. No. 15/091,061 (PG Pub 2016/0359685), filed Jun. 4, 2015. (Year: 2015).*

Brown, D.E., et al., "Mining Preferences from Spatial-Temporal Data", First SIAM International Conference on Data Mining, Apr. 5-7, 2001, pp. 1-17.

Chakirov, A., et al., "Activity Identification and Primary Location Modelling based on Smart Card Payment Data for Public Transport" 13th International Conference on Travel Behaviour Research, Jul. 15-20, 2012, 23 pages.

Foursquare for Developers, https://developer.foursquare.com, Printed on Mar. 28, 2016, 1 page.

Johnson, D.B., "Finding All the Elementary Circuits of a Directed Graph", SIAM Journal on Computing, Mar. 1975, pp. 77-84, vol. 4, No. 1.

Lin, M., et al., "Mining GPS Data for Mobility Patterns: A Survey", Pervasive and Mobile Computing, Jun. 2014, pp. 1-16, vol. 12.

Mahmud, J., et al., "Home Location Identification of Twitter Users", ACM Transactions on Intelligent Systems and Technology, Jul. 2014, 20 pages, vol. 5, No. 3, Article 47.

Mobile Marketing Association, "Using Location for Audience Targeting", Feb. 2015, 14 pages.

Nominatim, https://nominatim.openstreetmap.org, Printed on Mar. 28, 2016, 2 pages.

Open Street Map, http://www.openstreetmap.org, Printed on Mar. 28, 2016, 1 page.

Qin, et al., "Patterns, Entropy, and Predictability of Human Mobility and Life", PLoS ONE, Dec. 26, 2012, pp. 1-8, vol. 7, Issue 12.

* cited by examiner

|  | CLUSTER 0 | CLUSTER 1 WORK | CLUSTER 2 HOME | CLUSTER 3 WORK |
|---|---|---|---|---|
| # RESIDENTIAL LOCATIONS | 109 | 22 | 157 | 50 |
| # COMMERCIAL LOCATIONS | 78 | 173 | 34 | 146 |
| TOTAL # LOCATIONS | 187 | 195 | 191 | 196 |
FIG. 5B
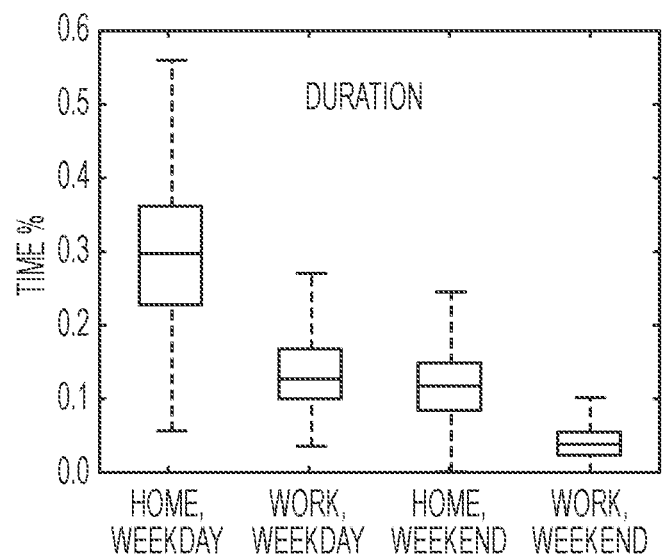
FIG. 6A
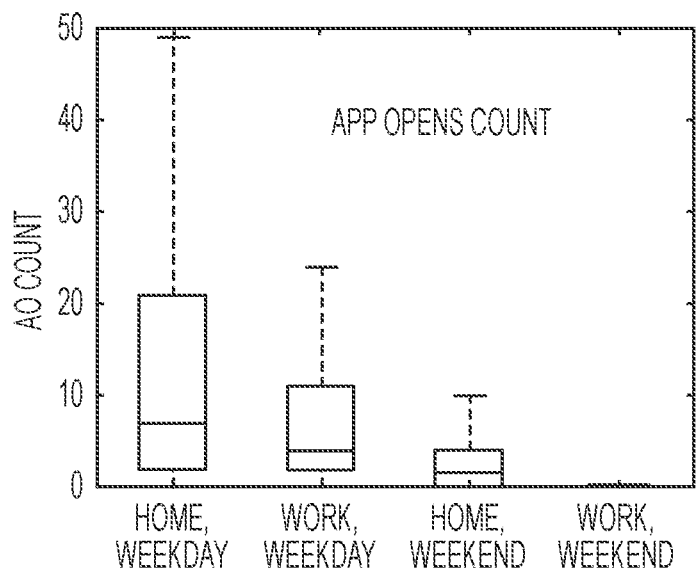
FIG. 6B

ORIGINAL USER ACTIVITY DATA

UNWEIGHTED ESTIMATE OF USER-SPECIFIC DISTRIBUTION PARAMETERS

WEIGHTED ESTIMATE OF USER-SPECIFIC DISTRIBUTION PARAMETERS

POSTERIOR ESTIMATE, LEVERAGING A PRIOR DETERMINED FROM THE AGGREGATE ACTIVITY

AUTOMATIC EXTRACTION OF USER MOBILITY BEHAVIORS AND INTERACTION PREFERENCES USING SPATIO-TEMPORAL DATA

BACKGROUND

The present application relates generally to computers and computer applications, and more particularly to mobile devices and extracting user mobility behavior and interaction preferences using spatio-temporal data associated with the mobile devices.

The ability to deliver content at the right time, the right place and to the right set of users may provide a better targeting tool for capturing user's attention, for example, on a user's mobile device. Increasingly, vast amounts of spatial-temporal data are becoming available from mobile messaging platforms. Using these data, it may be possible to understand behavioral patterns of mobile users across large geographical areas.

BRIEF SUMMARY

A computer-implemented method and system to automatically determine user mobility behaviors and interaction preferences using spatio-temporal data and engage users may be provided. The method, in one aspect, may include receiving spatio-temporal data comprising location data as a function of time, app interaction data as a function of time, and geographic map data comprising geographic coordinates. The method may also include constructing a user trajectory graph based on spatio-temporal data. The method may also include determining mobility patterns based on the user trajectory graph. The method may also include deriving features from the mobility patterns. The method may also include clustering users into groups, wherein the users in a same group have similar feature values associated with the features, and the users in different groups have different feature values. Whether a feature value is similar or different may be determined based on meeting a similarity threshold. The method may also include identifying personas and location sets based on the clustering. The method may also include constructing a distribution model, wherein an outcome indicates a preference for a particular time bin on a particular day for a particular location. The model, for example, may be a multinomial distribution model. The method may also include monitoring user device's location and responsive to detecting that the user device is at the particular location at a particular time estimated as a preferred time and location, pushing content to the user device.

A system to automatically determine user mobility behaviors and interaction preferences using spatio-temporal data and engage users, in one aspect, may include one or more processors communicatively coupled to one or more storage devices. One or more of the processors may be operable to receive spatio-temporal data comprising location data as a function of time, app interaction data as a function of time, and geographic map data comprising geographic coordinates from one or more of the storage devices. One or more of the processors may be further operable to construct a user trajectory graph based on the spatio-temporal data. One or more of the processors may be further operable to determine mobility patterns based on the user trajectory graph. One or more of the processors may be further operable to derive features from the mobility patterns. One or more of the processors may be further operable to cluster users into groups, wherein the users in a same group have similar feature values associated with the features, and the users in different groups have different feature values. Whether a feature value is similar or different may be determined based on meeting a similarity threshold. One or more of the processors may be further operable to identify personas and location sets based on the clustering. One or more of the processors may be further operable to construct a distribution model, wherein an outcome indicates a preference for a particular time bin on a particular day for a particular location. One or more of the processors may be further operable to monitor user device's location and responsive to detecting that the user device is at the particular location at a particular time estimated as a preferred time and location, one or more of the processors may be further operable to push content via a network to the user device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 5A and 5B illustrate location clustering in one embodiment of the present disclosure.

FIG. 6A shows duration of time spent at locations at different times of days during weekends and weekdays in one embodiment of the present disclosure.

FIG. 6B shows the number of app opens (app open counts) at locations at different times of days during weekends and weekdays in one embodiment of the present disclosure.

DETAILED DESCRIPTION

Figure 1:
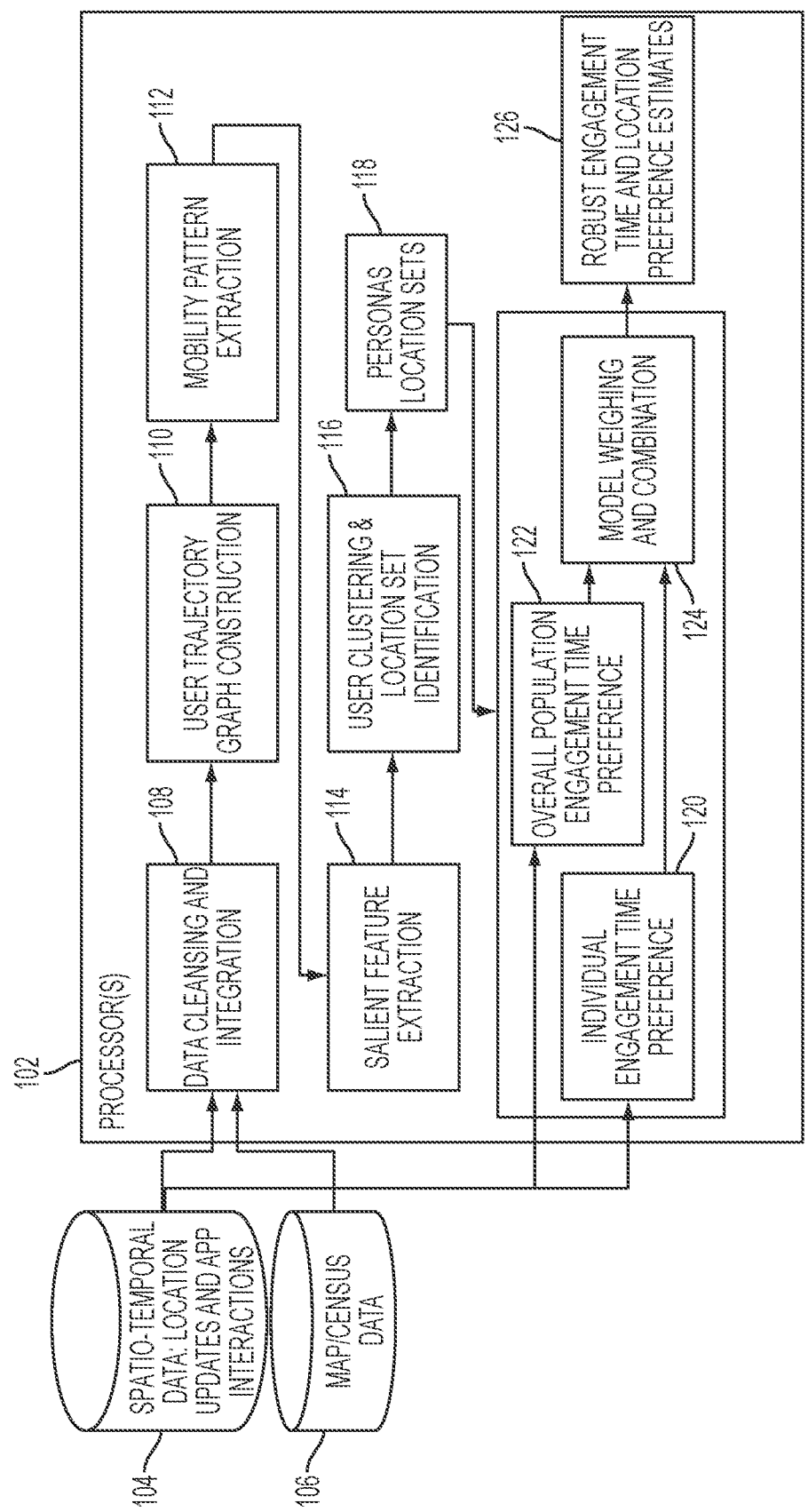
FIG. 1 illustrates system architecture for extracting user mobility behaviors and interaction preferences using spatio-temporal data in one embodiment of the present disclosure.

FIG. 1 illustrates system architecture for extracting user mobility behaviors and interaction preferences using spatio-temporal data in one embodiment of the present disclosure. A system shown in FIG. 1, for example, determines what content to push or transmit to which mobile device or set of mobile devices (e.g., so that a user of a mobile device can receive or view the content) at what time and what location. One or more hardware processors 102 may run or execute the components of the system shown in FIG. 1. The system, for example, in one embodiment, understands, for example, analyzes and derives the patterns of individual users by utilizing both spatial and temporal data, for example, including but not limited to, daily routine, the home-work patterns of the user, and weekend behaviors for the user. The system, in one embodiment, characterizes a user's persona based on the derived mobility patterns. Persona refers to a type or characteristic. An individual may be associated with persona. The system, for example, identifies a persona, for example, people with routine work-home style on weekdays, but very active over weekends with outdoor activities. As another example of persona, the system may identify stay-at-home people with high local mobility during the week, yet less active on weekends. Based on user's persona, the system in one embodiment uses the mobility patterns and their mobile app (application usage) to better understand the set of locations and times at which a user is more engaged.

Referring to FIG. 1, one or more storage devices or systems 104, 106 may store as a database or the like, data such as spatio-temporal data and mobile application (app) interaction data (shown at 104). Spatio-temporal data may include time and location of a user, for example, determined via a user's mobile device, for example, location coordinates as a function of time, and may also include altitude, speed as a function of time. The database 104 may also store mobile app interaction data. In one embodiment, the mobile app interaction data may include binary event data that is a function of time, for example, whether an app A was opened or closed at time T. The data set retrieved from the database 104, in one embodiment, may include the following data streams: App interactions for each user by time, for example, including app open, app close, notification click—these interactions serve as a proxy for engagement; Location updates for each user by time: latitude, longitude coordinates with accuracy measurement—these location data provide a mechanism to link user app engagement with the contextual information of where they are using the app. Such data may be available from mobile messaging platforms. Using the data, the system may understand behavioral patterns of mobile users across large geographical areas. Map and Census database 106 may store geographic map information and various establishments located in geographic areas. Merging the spatio-temporal data 104 with map data 106 allows additional context for identification of the type and/or purpose of a location.

A data cleansing and integration component 108 in one embodiment cleanses and integrates the spatio-temporal data, app interaction data 104 and map data 106. For example, duplicate data may be removed, invalid location coordinates may be removed and location stream with app interaction data stream may be combined (e.g., to link app interaction with location and time).

User trajectory graph construction component 110 in one embodiment constructs user trajectory graph to capture and represent a user's mobile activity over space and time. Trajectory graph may be constructed for each user (of all users being considered), for example, based on the received and cleansed data.

Mobility pattern extraction component 112 in one embodiment extracts mobility patterns from the trajectory graph to determine behaviors such as a user's daily routine, repeated or emerging activities, and understands how these typical behaviors vary over time.

Salient feature extraction component 114 in one embodiment extracts salient features to capture and represent a user's mobility patterns and define a user's persona. For similar users, sets of locations that have a similar purpose (location sets) across users (e.g., locations which are part of a commute, locations which are related to a person's home or work, etc.) may be identified, for example, by mapping coordinates to home or work locations.

The system in one embodiment determines user interaction time preferences by considering user interactions at the individual and population level to build robust preference models. The system may use historical app interaction data and measure interaction preferences and understand how interaction preferences vary across location sets and times to target users at the right time and place.

User clustering and location set identification component 116 clusters users into groups where users in the same group possess similar behaviors or feature values of salient features extracted at 114, and users across groups behave differently. In one embodiment, one or more clustering techniques such as K-means clustering and agglomerative clustering may be employed to perform this clustering at 116. Based on the clusters, personas and location sets 118 associated with the clusters may be identified. Clusters may be of different sizes.

Individual engagement time preference component 120 in one embodiment may obtain data for the individual user's times of engagement. For example, it collects the time-stamped interactions of the individual user of interest and maps these time-stamped interactions to the appropriate preference bin. To illustrate as an example, Friday, March XX, 20XX 9:51 am may be mapped to the 9 am-10 am Friday bin if hourly bins were used across the week. Once the correct bin is determined, a weight value is added to that bin. For example, the weight may count the number of interactions, or it may assign more weight for high value actions or more recent interactions.

Overall population engagement time preference component 122 may function similarly to the individual engagement time preference component 120, but based on overall population information. For example, rather than considering the user actions individually, the overall population engagement time preference component 122 may consolidate or aggregate all interactions into one set of preferences and build preference bins based on the consolidated interaction data.

Model weighing and combination 124 determines robust engagement time and location preference estimates 126 for an individual based on the determinations from the individual engagement time preference component 120 and the overall population engagement time preference component 122. In one embodiment, the combination takes into account the strength of the user preferences with respect to the overall population preferences. In one embodiment, the system will have a more personalized preference for users with more interactions than those without.

Persona and location set identification in one embodiment may include the following, which for-example, can be used for mobility pattern extraction. For example, a user characteristic and a set of locations the user has visited may be identified as follows. For each user, the system may build a trajectory graph to capture the sequence of locations visited along with location statistics and time information. In one embodiment, the system may construct the graph incrementally by considering each location visited in a user's location stream. In one embodiment, locations are represented by nodes in the graph; nodes A and B have a directed edge from A to B if a visit to B follows a visit to A. Given the trajectory graph, the system may identify key locations and location sets in the graph. For example, cycles in the trajectory graph show common sequences and nodes with high degree of cycling and large average stay times may indicate important places. Key locations like home or work can be identified by considering how individuals spend time in locations (hours of occupancy, days of visits), frequency of visits, and consistency.

Based on the key locations and location sets in the graph, the system may identify personas by grouping users which show similar behaviors and possess similar location sets. For example, the system may identify all users who have a home-work pattern—these users belong to the persona that works regularly. Other personas may correspond to users who spend time at parks or frequently spend time at shopping malls—these classifications are assisted by considering map data. For users in each persona, the system may identify the location set that is pertinent to that persona: e.g., the location set for regular workers may include home, work, and potentially public transit stations. In this way, in one embodiment, the system may characterize interaction behaviors at location types, for example, rather than individual physical locations.

Based on the persona and location set identification, and considering user's historical engagement times, the system in one embodiment builds engagement time preference models. For instance, robust models may be built that determine when users prefer to engage by considering the users historical engagement times and the identified persona and location set. The models in one embodiment may intelligently combine individual user history and the aggregate population history.

Figure 2:
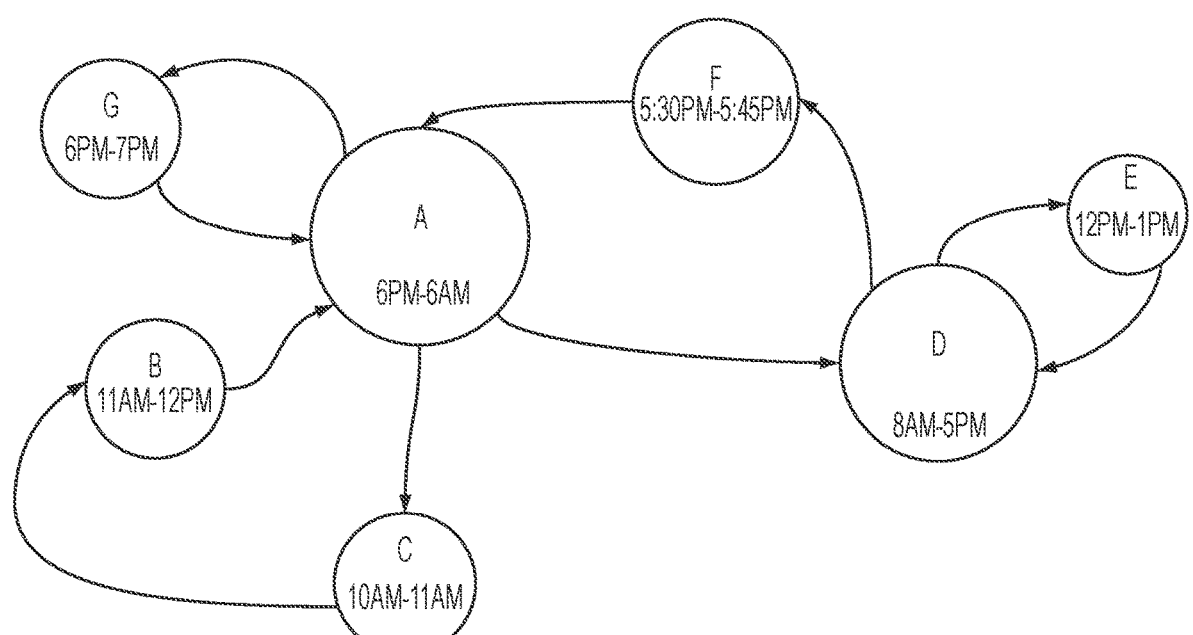
FIG. 2 shows an example trajectory graph constructed according to one embodiment of the present disclosure.

FIG. 2 shows an example trajectory graph constructed according to one embodiment of the present disclosure. The graph has following properties in one embodiment of the present disclosure. The graph is directed or cyclic. Each node indicates a location specified in the spatio-temporal data, for example, a location that a user is determined to have been at a time. Edge weights (of edges between two nodes) indicate likelihood of a travel between two locations (two nodes). Weight is parameterized by time, the likelihood being measured as the normalized frequency of traveling from one location to another, for example, with 80% likelihood that the user will travel from node A to node D around 7:30 am, and with 70% likelihood that the user will travel from A to G around 6 pm. Node size (or weight) indicates the frequency of visits to that node. In one embodiment, nodes are labeled with the time duration (e.g., 6 pm-6 am at Location A) that occurs most frequently. From the graph, the system may infer that node A is likely a home, that node D is likely a work place, that the user visits node F frequently on the user's way home from work, but not all the time, and that node E is place that is sometimes visited from work only, for example, for lunch.

Based on the trajectory graph, the system in one embodiment identifies key locations and paths. Analytics and pattern detection may be used to extract subgraphs with edge weights having values greater than a threshold edge weight value, and node weights having values greater than a threshold node weight value. For instance, locations that have long stay times and high weight are considered key locations in one embodiment. Routine patterns of the user manifests as cycles in the graph where the edges have high weights. These routine patterns are considered to have a common purpose: e.g., trip to work, errands, and/or recreational activities. Inference of the purposes of these nodes is facilitated by node labeling.

Using the trajectory graph, the system may extract, derive, or generate a mobility pattern. In one embodiment, to derive a mobility pattern, the system may create user location-time signature. For creating user location-time signature, the system may, for each user, aggregate time spent at each location and at each hour of weekday and weekend days. The system may filter out locations that may not be in the user's daily routine. For example, criteria such as the frequency of the user being at a location within a month is less than a threshold number (e.g., 5), the duration of stay at a location is less that 10% (percent or percentage) of the total duration of the user, and/or other criteria may be used to filter out locations to be not part of the user's daily routine. The system may group hours of the day into n (e.g., n=6, every 4 hours) bins (time bins) and calculate time percentage (%) of each bin, i.e., percentage of time spent in each bin out of total time in a period being considered. For each user there may be location-time signatures for different locations, for example, a location-time signature per location.

The system may cluster locations by a clustering approach such as a K-means technique based on the location-time signature features. The system may label each cluster (e.g., home, work, and other labels) based on the location-time signature of its centroid. For example, a location may be labeled as "work" if a threshold time % (high time %) is spent during the hours of 8 am-8 pm weekdays in that location, while less than another threshold time % (little time) is spent during 12 am-8 am weekdays and weekends in that location. As another example, a location may be labeled as "home" if a threshold time % is spent in that location during 12 am-8 am weekdays and weekends. Analytics may include rules for labeling the locations based on the location and time signature.

Figure 3:
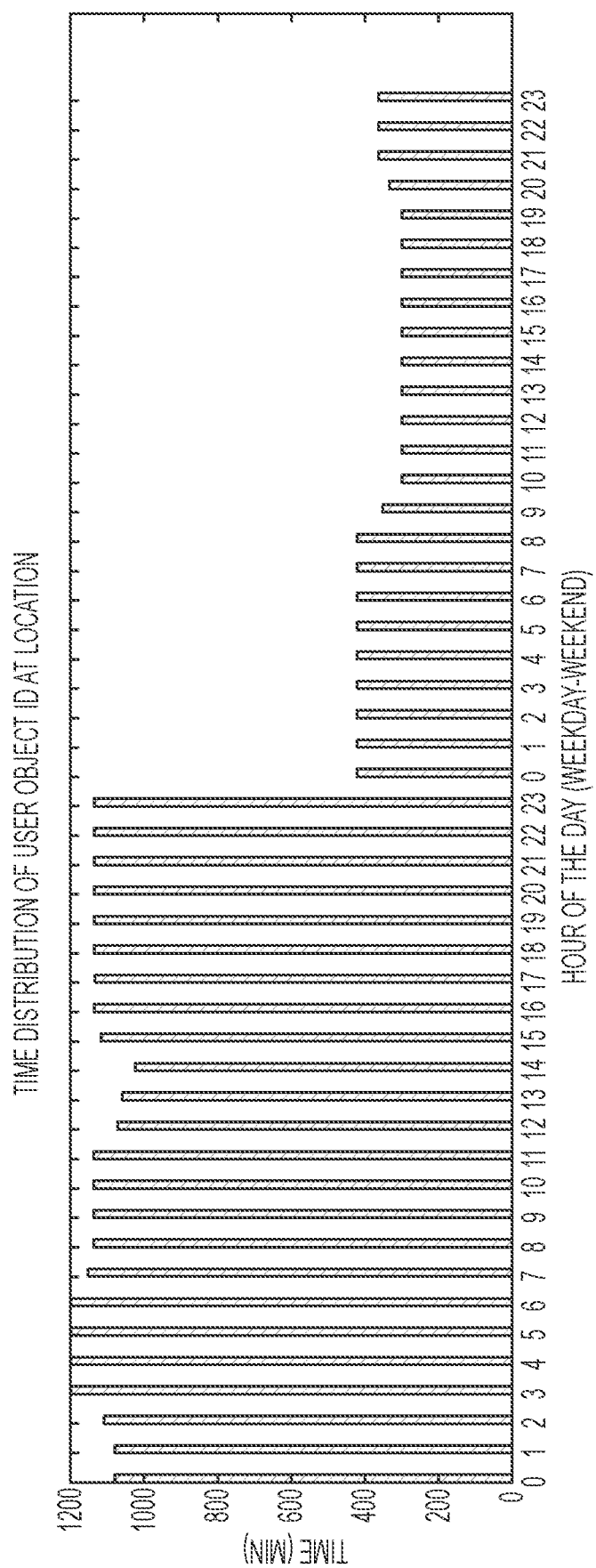
FIG. 3 shows an example of a location and time signature in one embodiment of the present disclosure.

FIG. 3 shows an example of a location-time signature, for instance, amount of time spent (e.g., minutes) by a user during hours of the day on weekdays and weekends at a location during a period being considered.

Figure 4A:
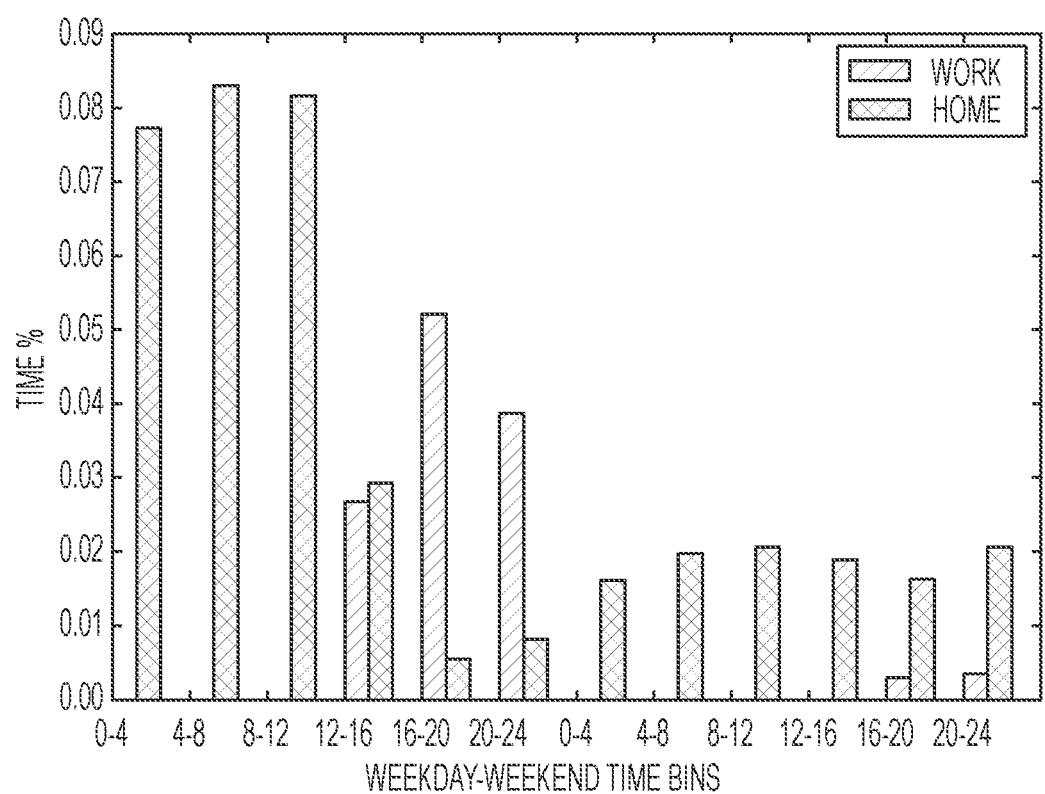
FIGS. 4A-4C show examples in one embodiment of the present disclosure of time bins and amount of time spent during those time bins at locations labeled as home and work for example users.
Figure 4B:
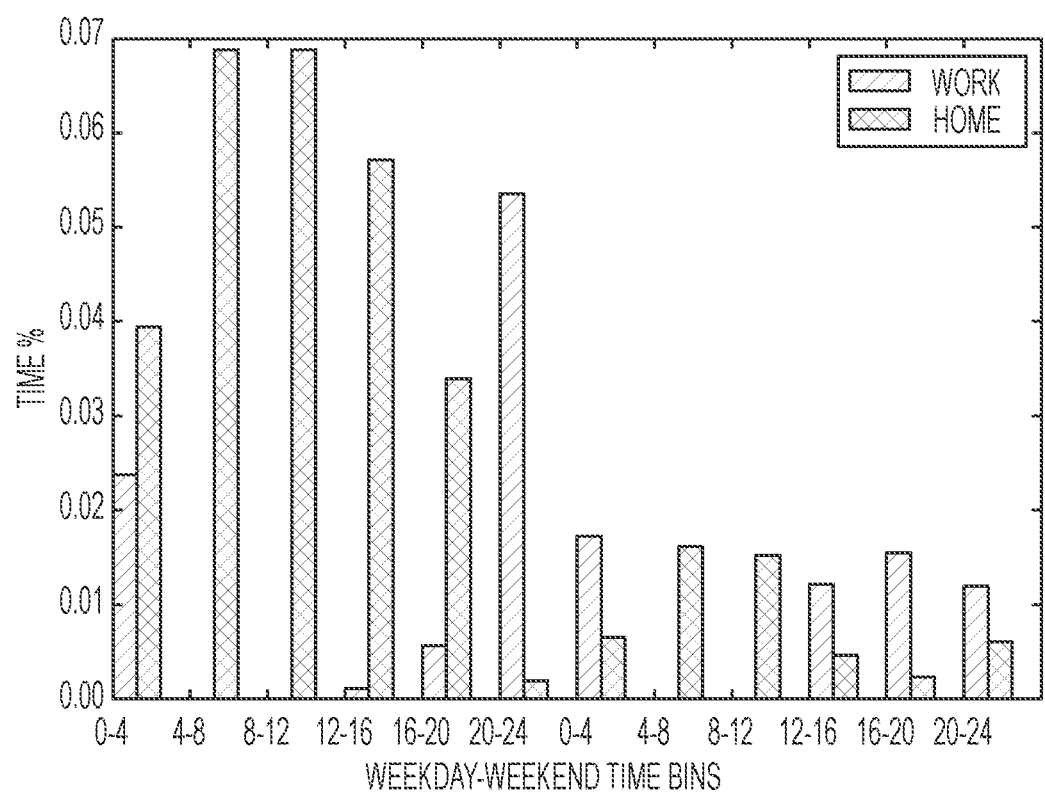
Figure 4C:
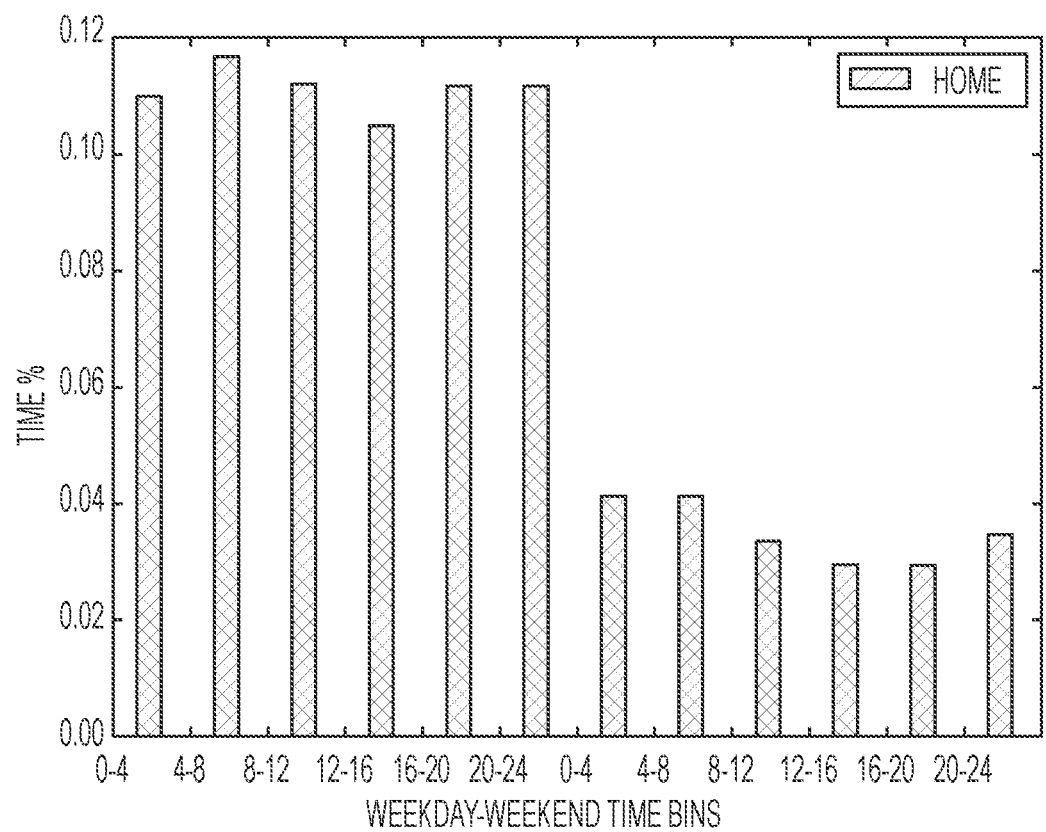

FIGS. 4A-4C show examples of time bins and amount of time spent during those time bins at locations labeled as home and work for example users. The figures show users' work-home patterns. FIG. 4A shows an example for user 1. User 1 in the example shown in FIG. 4A primarily works from 12-24 (UTC time, or 8 am-8 pm EST) weekdays. The time % at home location is in general larger than that of at work location.

FIG. 4B shows an example for user 2. User 2 in the example shown in FIG. 4B primarily works from 0-4 and 20-24 (UTC time, or 16-24 EST) weekdays and weekend days. User 2, for example, may be considered to belong to types of users who work at locations such as hotels, hospitals or other locations where there are shifts such as night shifts and weekend shifts.

FIG. 4C shows an example for user 3. User 3 in the example shown in FIG. 4C primarily stays at home as the time at this location accounts to 87% of the total duration. These types of users could be people working from home or who have retired.

Figure 5A:
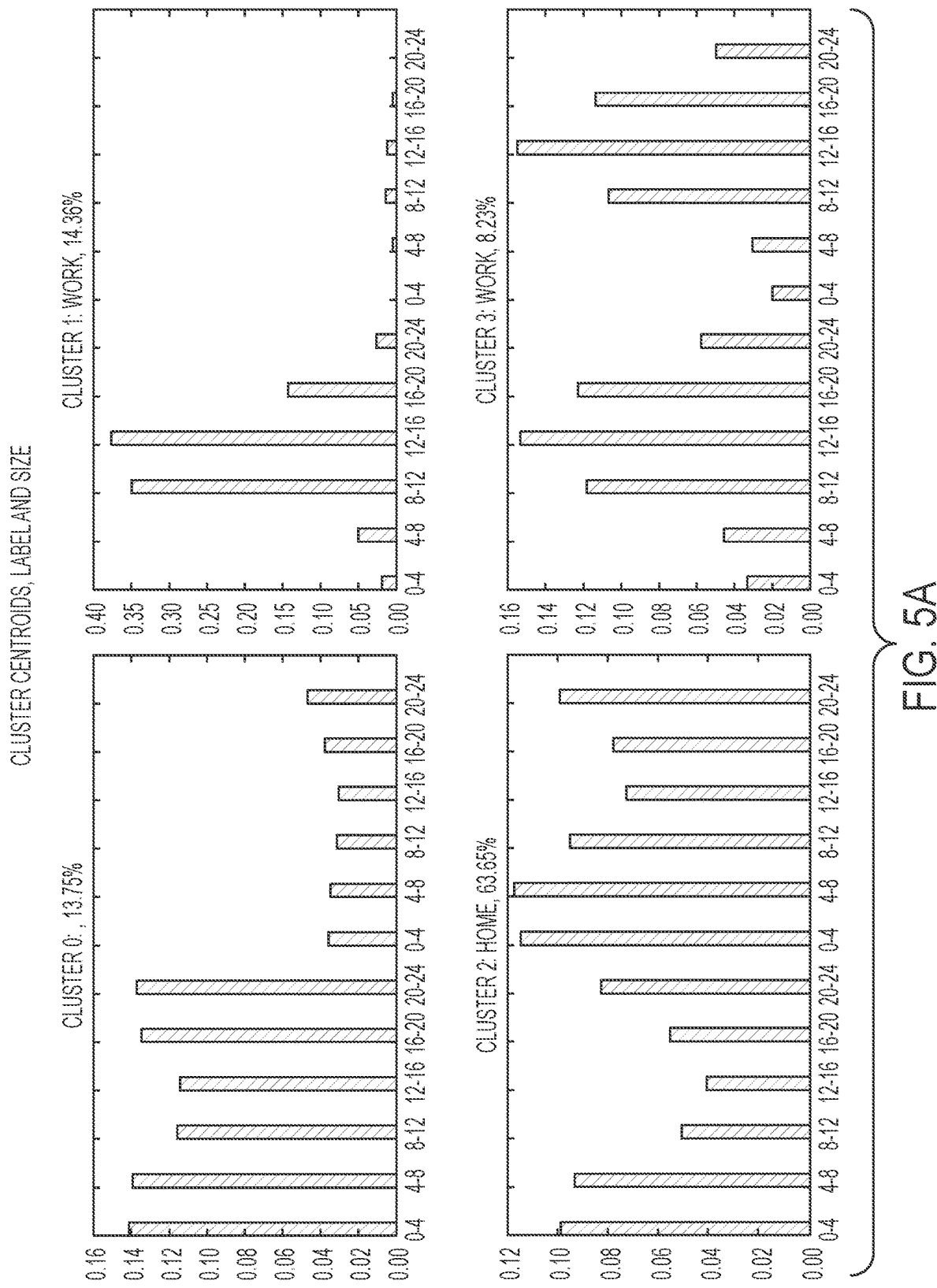

FIGS. 5A and 5B illustrate location clustering in one embodiment of the present disclosure. With location-time signatures, the system in one embodiment may group them into clusters using a clustering algorithm, for example, K-means algorithm. In order to determine the right number of clusters N, the data set is clustered by varying N and it is examined whether distinct clusters are obtained at each clustering round. For the example data set, it is found that when N=4, the four clusters are very distinct. In this example, increasing N does not bring new distinct clusters. FIG. 5A shows these 4 distinct clusters. In this section, each cluster in this figure is labeled based on its feature characteristics. Beginning with cluster 1, it can be seen that cluster 1 has very unique features. Users primarily spend time at this type of location during regular working hours (8 am-8 pm), weekdays. Thus, the system in one embodiment determines that cluster 1 includes work locations. There are 14.36% user-location signatures in this cluster. For cluster 2, users spent time at this type of locations during weekdays and weekends and each bin takes a fairly significant portion of time. This indicates that this type of location is very important to users. Also, it is observed that during 8 am-8 pm weekdays and 12 pm-8 pm weekend days, users usually spent less time at this type of locations, compared with other time bins. Based on these observations, the system in one embodiment determines that cluster 2 contains home locations. Cluster 2 is the largest cluster with a size of 63.65%. Cluster 3 also has a few interesting characteristics. Users spent more time at this type of location during 8 am-8 pm weekdays and weekend days than other time slots. Particularly, user spent very little time during night time (12 am-8 am) on weekdays and weekend days. Based on these observations, the system in one embodiment may conclude cluster 3 is composed of work locations where users work in both weekdays and weekend days. Cluster 3 has 8.23% user-location signatures. However, cluster 0 does not have any unique features that can be associated with home or work locations. Therefore, the location type in cluster 0 cannot be determined. In summary, through the unsupervised clustering modeling, the system in one embodiment may identify in this example, two work location clusters and one home location cluster. The system in one embodiment may label about 86% of the location signatures in the data set, with 63.65% as home locations and 22.70% as work locations.

In order to validate the clustering and prediction algorithm, the system may use the ground truth labels for the locations identified as home and work. In one embodiment, the true labels of locations may be determined using open location services such as OPEN STREET MAPS (OSM) and FOURSQUARE (FS). For example, a tool such as NOMINATIM may be used to query available OSM data using a location's latitude and longitude. Such a query returns tags describing the geographic attributes of the physical features (e.g., residential, roads, buildings, etc.) of the queried location. Similarly, FOURSQUARE (FS) is a local search and discovery service. FS provides methods to query the specific categories (e.g., 'Shop & Service', 'Residence', and 'Professional & Other Places') associated with a location. With the feedback from tools such as OSM and FS together, a location can be labeled "residential", "commercial" or others. These labels are considered as ground truth labels. For each cluster, we randomly sampled about 200 locations and then compare our labels with the ground truth labels obtained with OSM and FS. The accuracy can be counted as the percentage of commercial places labeled as "Work" and the residential places labeled as "Home" by the clustering approach of the present disclosure in one embodiment. FIG. 5B shows the validation result. It is seen that cluster 2 in FIG. 5A comprises of 82.2% residential locations, whereas cluster 1 and cluster 3 have 88.7% and 74.5% commercial locations, respectively. Recall that in the above example, cluster 2 was labeled as a home cluster and cluster 1 and 3 as work clusters. Also, recall that locations in cluster 0 are not labeled based on the cluster characteristics. This can be confirmed by FIG. 5B. This cluster is a mixture of residential and commercial locations, about 58% residential and 42% commercial. In summary, for 582 locations in clusters 1, 2, 3 in FIG. 5A that the system of the present disclosure has labeled as home or work, 476 (82%) of them can be confirmed by this validation test.

Considering users' home-work patterns, user preference of engaging at home or another location may be determined. FIG. 6A shows the box plot of duration of time spent at home and work locations during weekends and weekdays in one embodiment of the present disclosure. For example, the median duration of time a user spent at home location during weekdays is about 30% of the user's total time. The median value of user spending time at work locations during weekdays is about 15% of the total time. The median durations of time spent at home and work locations during weekend are about 15% and 4% of the total time respectively. These median values further confirm the accuracy of the labels determined in the present disclosure for home and work locations.

Similarly, FIG. 6B shows the box plot of application open event count at home and work locations during weekends and weekdays in one embodiment of the present disclosure. For example, the median count at home location during weekdays is 8, but this value varies greatly as indicated by the wide range between first and third quintiles. From FIG. 6B, it seems most application open events happened at home during weekdays. One may argue that this may be because typically users spent more time at home locations than at work locations (as shown in FIG. 6A). However, considering the active time a user has at home location (e.g., not sleeping), in generally, users are more likely to open applications at home than at work locations.

Figure 7:
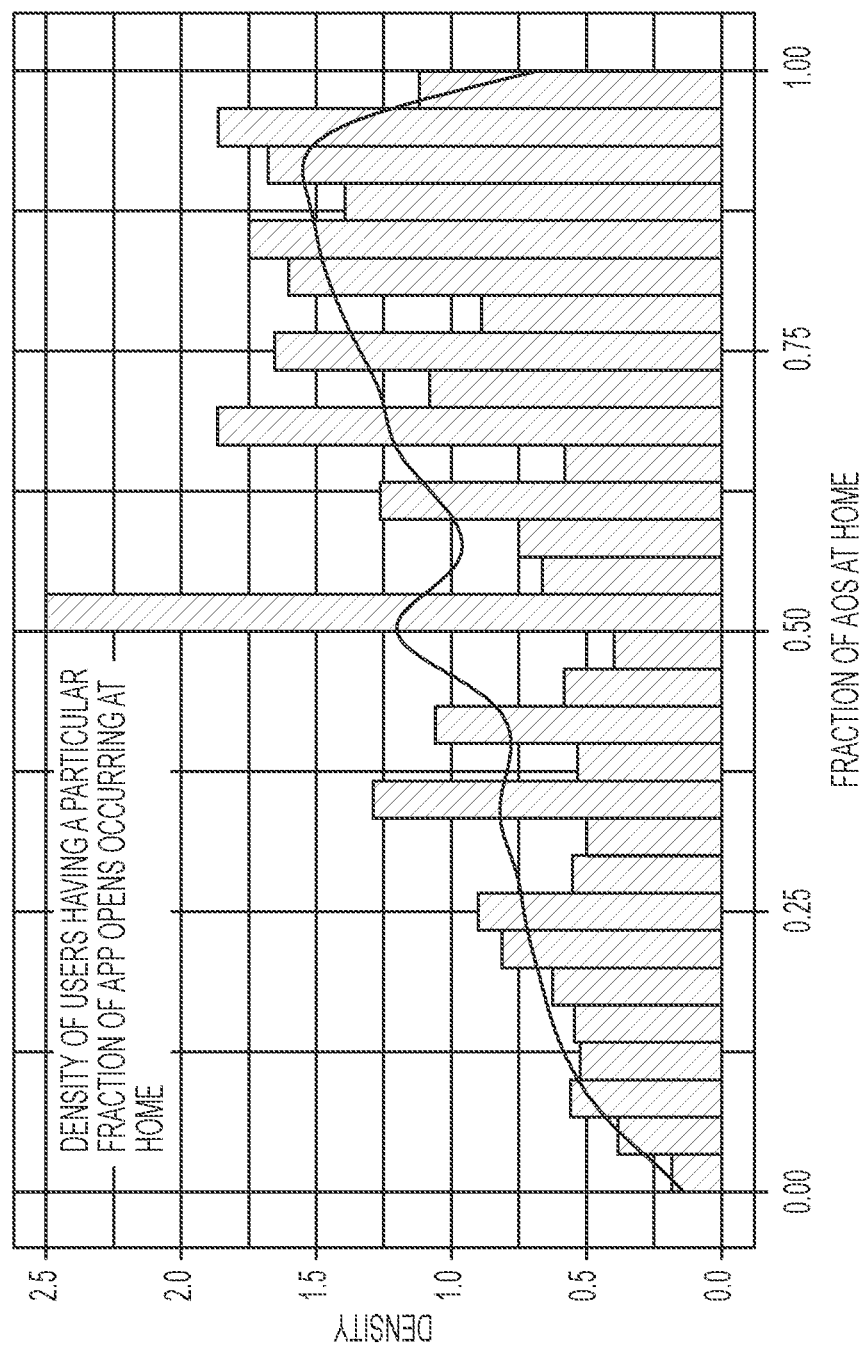
FIG. 7 illustrates an example distribution in one embodiment of the present disclosure that shows fraction of app opens occurring at home.

FIG. 7 illustrates an example distribution that shows fraction of app opens occurring at home. Average behavior favors engagement at home: 50% of the population has more than 65% of their app opens (AOs) at home. The population also may exhibit variations in preferences including: 30% of the population has more than 80% of their AOs at home; 25% of the population has more than 60% of their AOs at work. The figure represents a probability density or distribution across the entire population of each user's fraction of AOs at home.

Feature extraction (e.g., shown in FIG. 1 at 114) may include extracting or deriving features to capture key messages from the graph, and to represent the derived mobility pattern. Examples of features extracted from both weekday and weekend graphs constructed over a time period may include, but not limited to, the following: Total number of unique locations visited; The number and type of unique locations visited in weekday and weekend routines, respectively; Stay time at user's home as a percentage of total stay time across all locations (for the period that is being considered); The average stay time at user's home; The number of visits to user's home; The average distance from home to other locations with direct visits and other distance statistics (e.g., median, mean and standard deviation); The distance from home to work (e.g., only for weekday); The number and type of unique locations (and e.g., the average distance from home to the unique locations) that are only visited during weekdays; The number and type of unique locations (and e.g., the average distance from home to the unique locations) that are only visited during weekends.

Figure 8A:
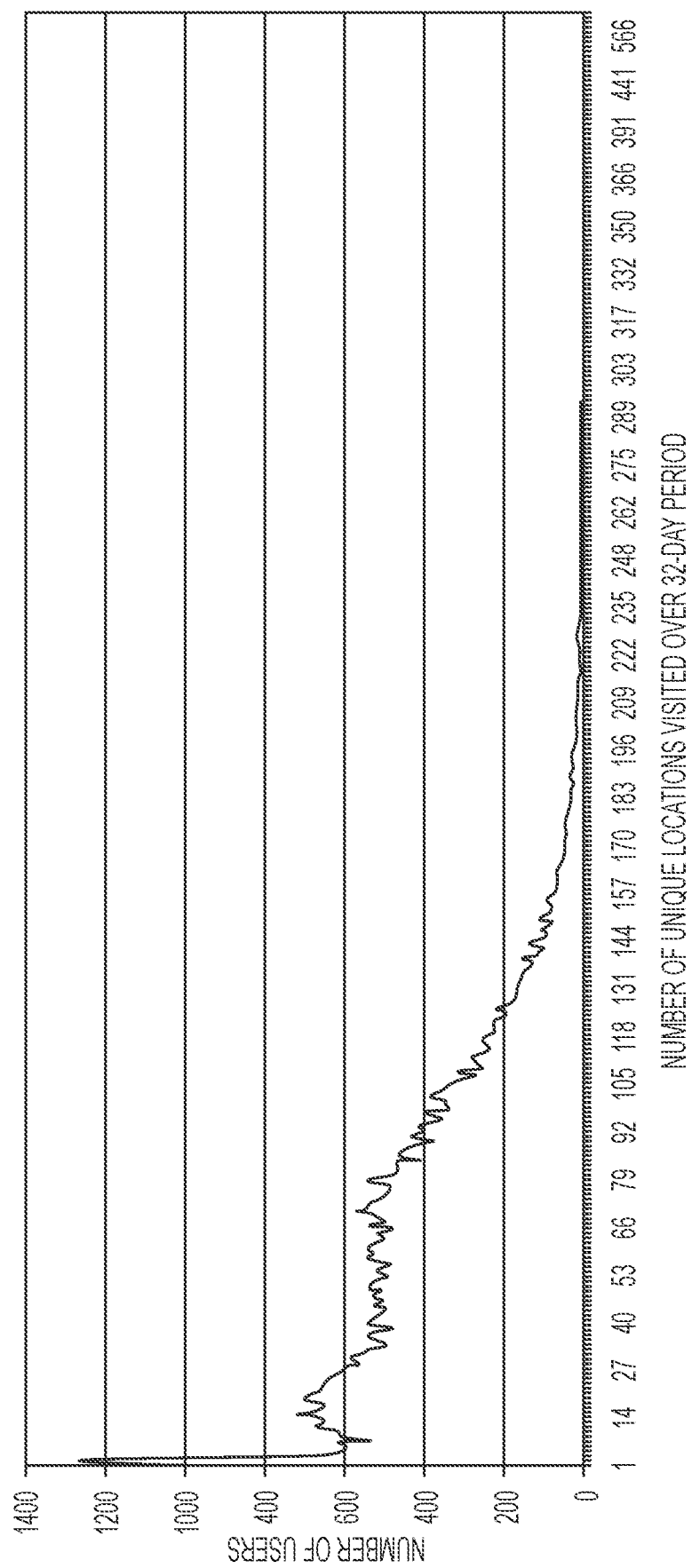
FIGS. 8A-8C show examples in one embodiment of the present disclosure of feature distribution among multiple users.
Figure 8B:
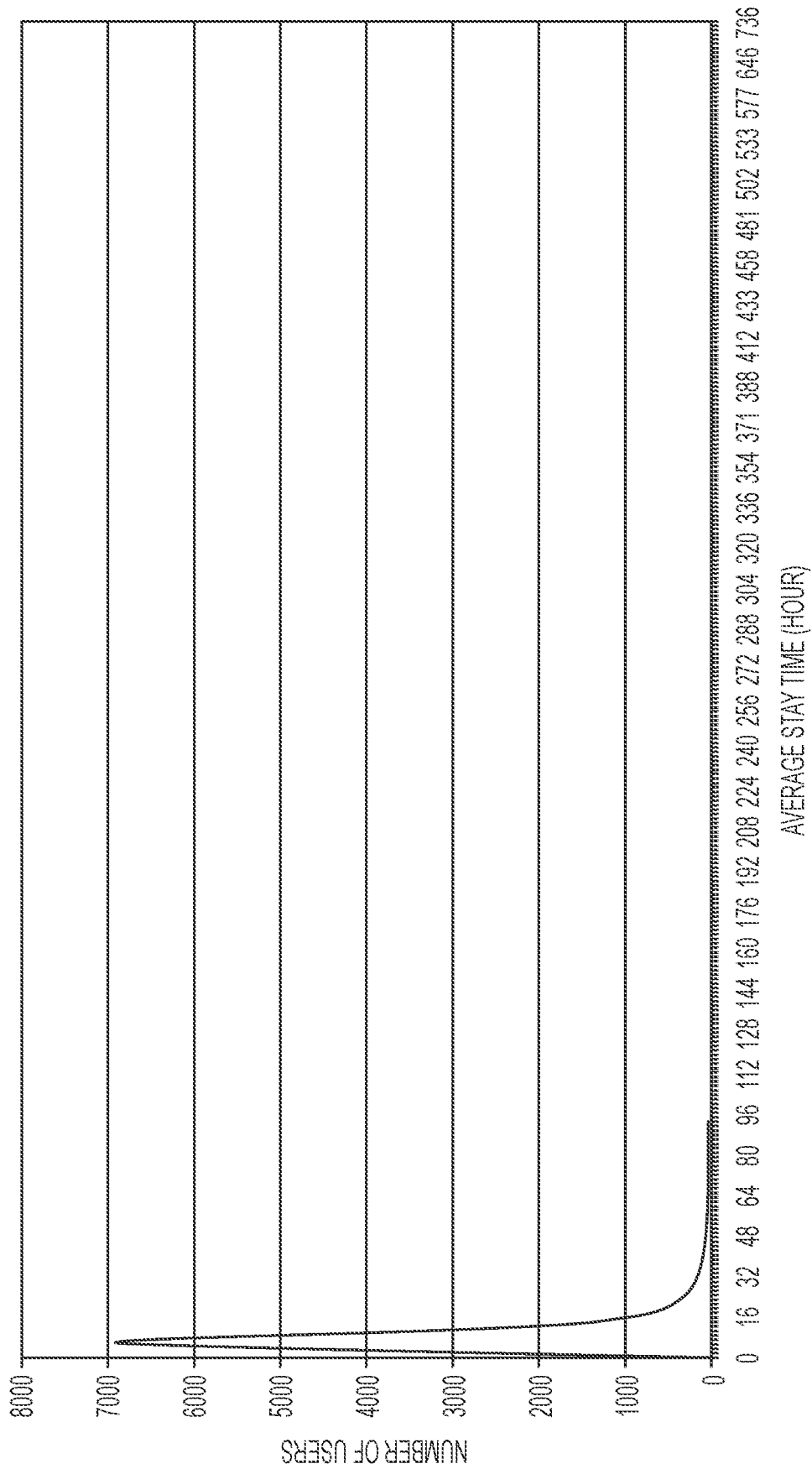
Figure 8C:
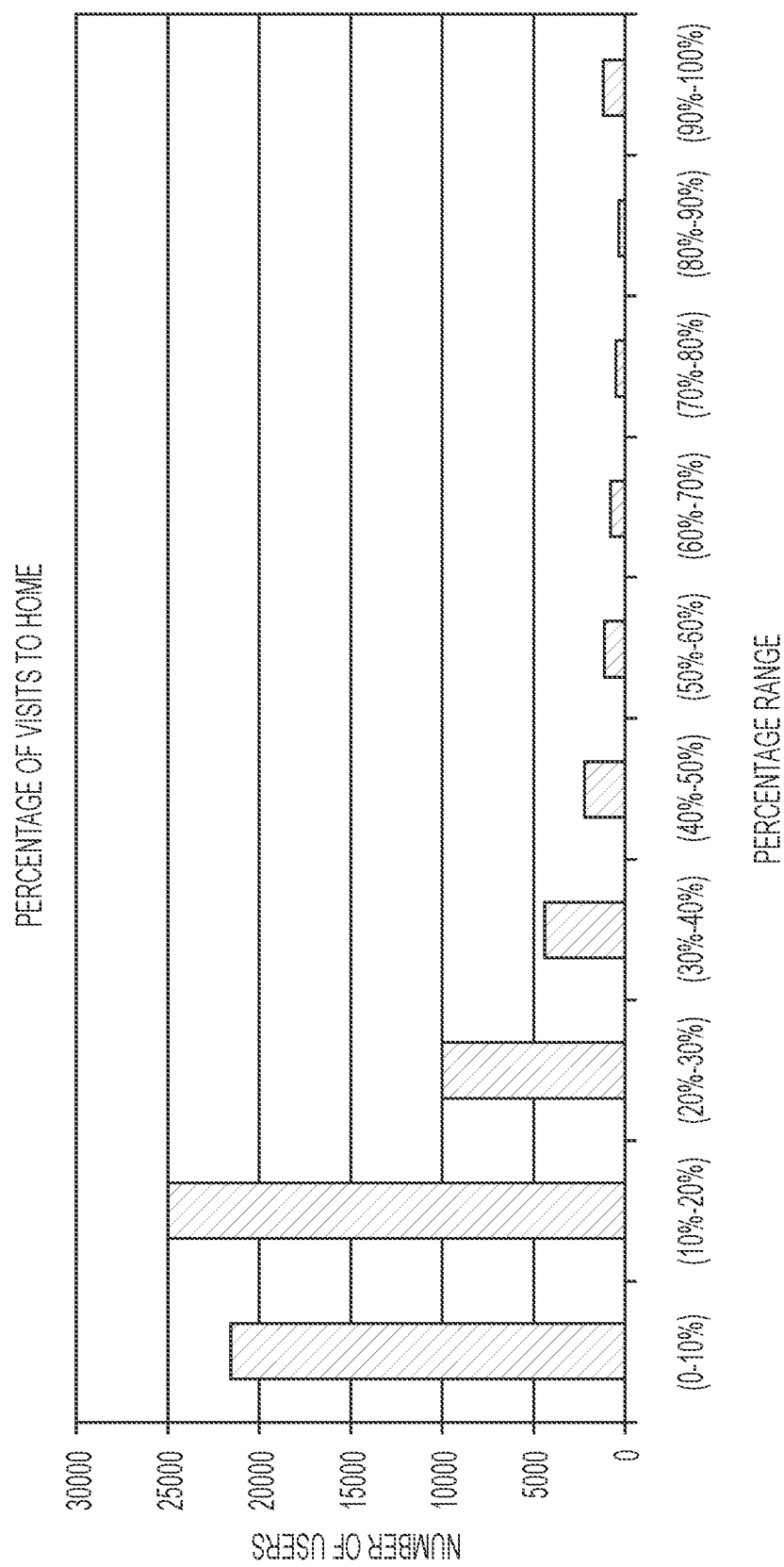

FIGS. 8A-8C show examples in one embodiment of the present disclosure of feature distribution among multiple users. The figures show information derived for a period of time. FIG. 8A shows an example of a unique location count for a plurality of users. The information derived in FIG. 8A shows that the number of unique locations visited by each individual user over a temporal period varies a lot. Specifically, about 2% of users have visited only 1 location over the time, which shows that these are people with very low mobility. In contrast, there are about 52% of people with high mobility, who have visited more than 150 locations during the same time period. FIG. 8B shows an example of average stay time at home for a plurality of users. The information derived in FIG. 8B shows that about 20% of users spent an average of 5-6 hours at their homes, FIG. 8C shows an example of percentage of visits to home for a plurality of users. Specifically, it shows that for about 32% of users, less than 10% of their visits are to their home. In contrast, for about 7% of people, more than 50% of their visits are to their home. In summary, these three graphs illustrate three features which have captured significant variations among users. The system and/or method of the present disclosure in one embodiment may apply these three features for clustering users into different categories.

Figure 9:
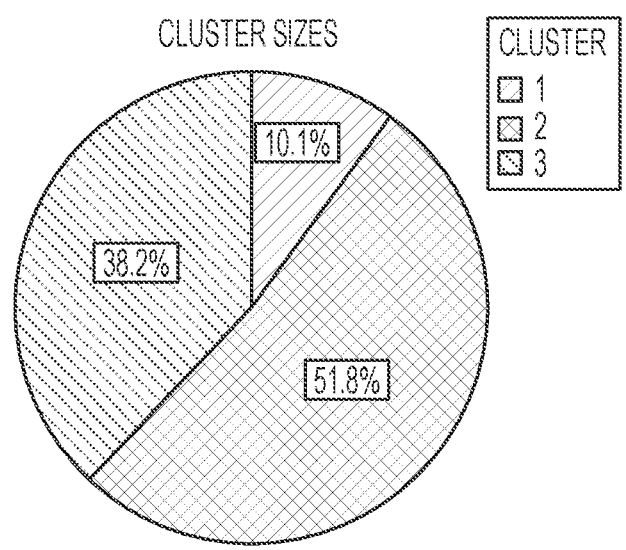
FIG. 9 shows an example in one embodiment of the present disclosure of clustering all users into three clusters of different sizes.
Figure 10A:
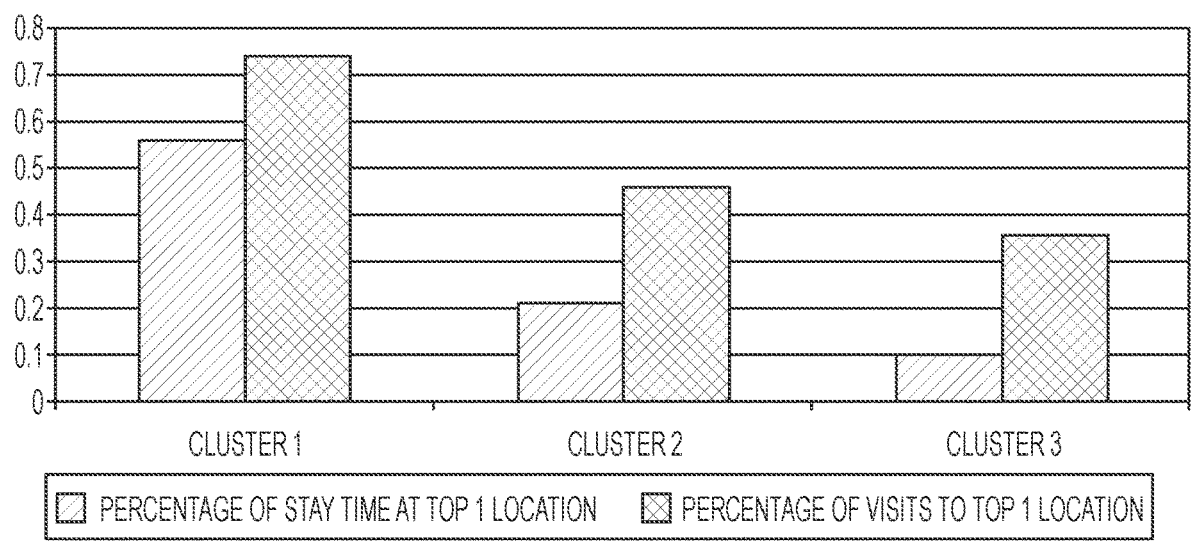
FIGS. 10A and 10B show examples in one embodiment of feature distribution of the three example clusters.
Figure 10B:
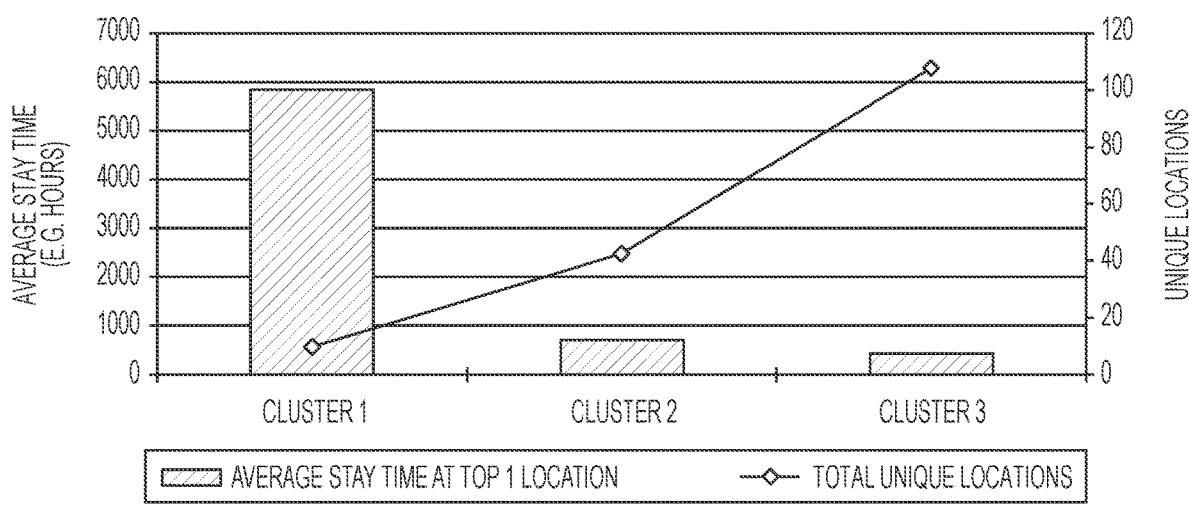

User clustering (e.g., shown in FIG. 1 at 116) in one embodiment clusters users into groups where users in the same group possess similar behaviors and/or feature values, and users across groups behave differently. Clustering approaches such as K-means clustering and/or agglomerative clustering may be employed to perform the clustering in one embodiment. FIG. 9 shows an example in one embodiment of the present disclosure of clustering all users into three clusters of different sizes using features such as those illustrated in FIGS. 8A, 8B and 8C. FIGS. 10A and 10B show examples in one embodiment of feature distribution of the three example clusters. FIG. 10A shows an example distribution of density feature of cluster centroids. FIG. 10B shows an example distribution of diversity and duration features of cluster centroids. In those examples, all three cluster centroids are well separated and with unique signatures. Cluster 1 tends to contain users with low mobility, with low diversity (unique locations), high density (percentage of visits) and largest duration (stay time) at its top location (e.g., home). Cluster 3 tends to contain users with high mobility, with large diversity (unique locations), low density (percentage of visits) and shortest duration (stay time) at its top location (i.e. home). Cluster 2 captures users with a medium level of mobility.

Engagement temporal preference estimation (e.g., shown in FIGS. 1 at 120, 122 and 124) in one embodiment determines the best time-of-day and day-of-week to contact automatically individual users, for instance, to automatically push or transmit content to the user's mobile device. For this estimation or determination, the system in one embodiment of the present disclosure may model user timing preferences as a multinomial distribution where each outcome indicates a particular time bin on a particular day. The distribution represents a user's preference for when they engage with a particular mobile app. In one embodiment the system and/or method of the present disclosure may model the preference using distinct bins which represent the hours of the day across the 7 days of a week—yielding 168 bins. The preference is constructed by mapping prior user interactions to these bins and counting the number of events. Events can be weighted to give more weight to recent events. The output of the model is a user preference for each of the possible bins. A best bin may be found by picking the bin with the highest preference.

In one embodiment, the system may use n uniform bins per day across the week (e.g., 7n total bins). To capture the hypothesis that more recent activity is more important in determining future activity, the system in one embodiment may weight older data by a factor $$\propto \exp\left(-\frac{\delta_s}{\gamma}\right)$$

where $\delta_s$ is the time elapsed since the s-th prior content launch and $\gamma$ is a decay factor.

For users with limited content interaction (e.g., mobile app interactions), it may be difficult to accurately estimate their preferences. To overcome sparsity, the system in one embodiment may use a Dirichlet prior derived from the aggregate user interaction history. The posterior estimate then becomes:

$$\hat{\theta}_k^{(i)} = \frac{n_k^{(i)} + \alpha_k}{\sum_l n_l^{(i)} + \sum_l \alpha_l n_k^{(i)}}:$$

Weighted count of user i actions in bin k.
where $\alpha_k$ are parameters of the Dirichlet distribution and are chosen subject to $$\frac{\alpha_k}{\sum_l \alpha_l} \propto \frac{\sum_i n_k^{(i)}}{\sum_{i,l} n_l^{(i)}}.$$

∝ represents "proportional to" symbol.

The quantity $n_k^{(i)}$ represents the weighted interaction count of user i actions in time-preference bin k. $\Sigma_l n_l^{(i)}$ is the sum of user i's weighted interactions across all bins (or the weighted sum of interactions). $\alpha_k$ represents the parameter for the k th bin of the global, aggregate population preference. $\Sigma_l \alpha_l$ is the sum of all parameters for the aggregate model.

Figure 11A:
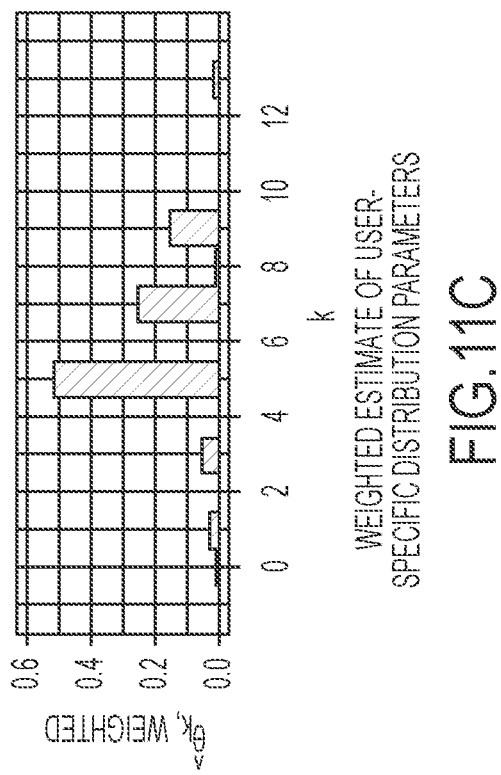
FIGS. 11A-11D illustrate examples in one embodiment of engagement temporal preference estimation.
Figure 11B:
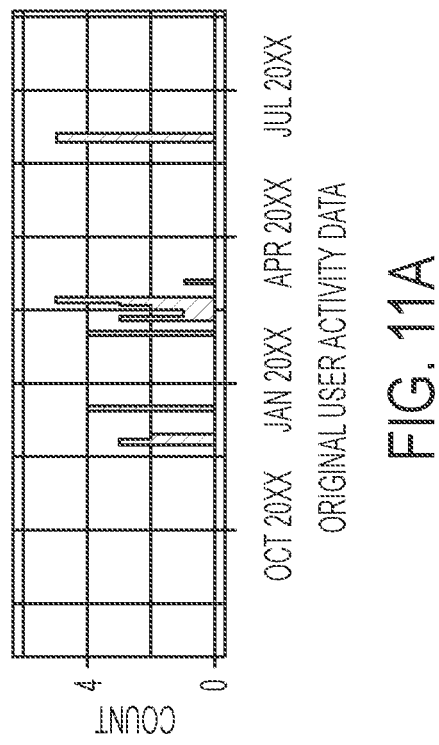
Figure 11C:
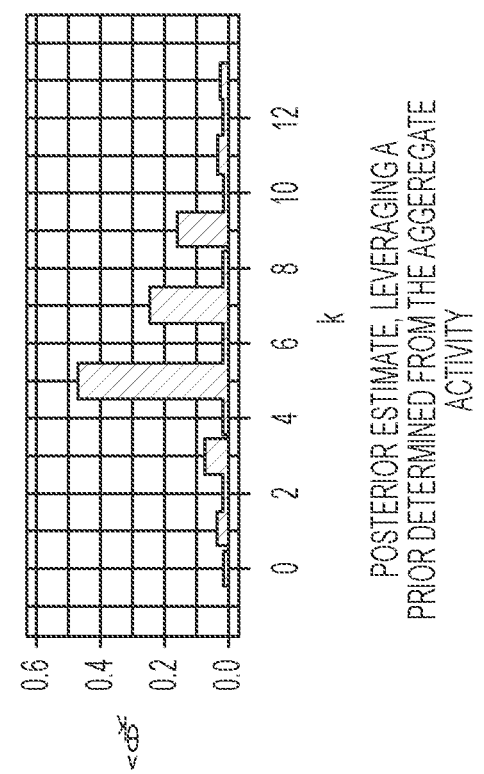
Figure 11D:
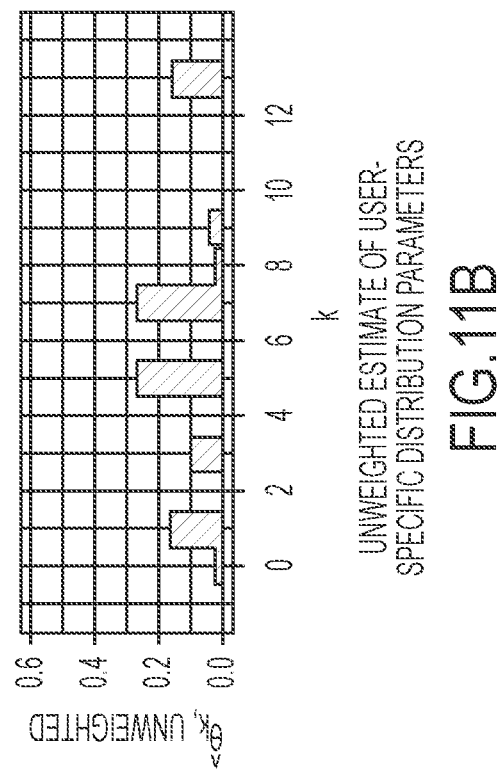

FIGS. 11A-11D illustrate examples in one embodiment of engagement temporal preference estimation. FIG. 11A shows an example of original user activity data. FIG. 11B shows an example of unweighted estimate of user-specific distribution parameters. FIG. 11C shows weighted estimate of user-specific distribution parameters. FIG. 11D shows posterior estimate, leveraging a prior determined from the aggregate activity. In FIG. 11A, the x-axis represents time, and the y-axis represents the count of interactions by a particular user. This is the raw data. In FIG. 11B, the raw data is mapped to the preference model (without weighting). The x-axis represents the preference bin, the y-axis represents the fraction of interactions in that bin. In FIG. 11C, the weighting is added to account for recency. The x-axis represents the preference bin, the y-axis represents the fraction of weighted interactions in that bin. FIG. 11D takes into account a global estimate and recalculates the individual estimate. The x-axis represents the preference bin, the y-axis represents the preference for that bin.

Figure 12A:
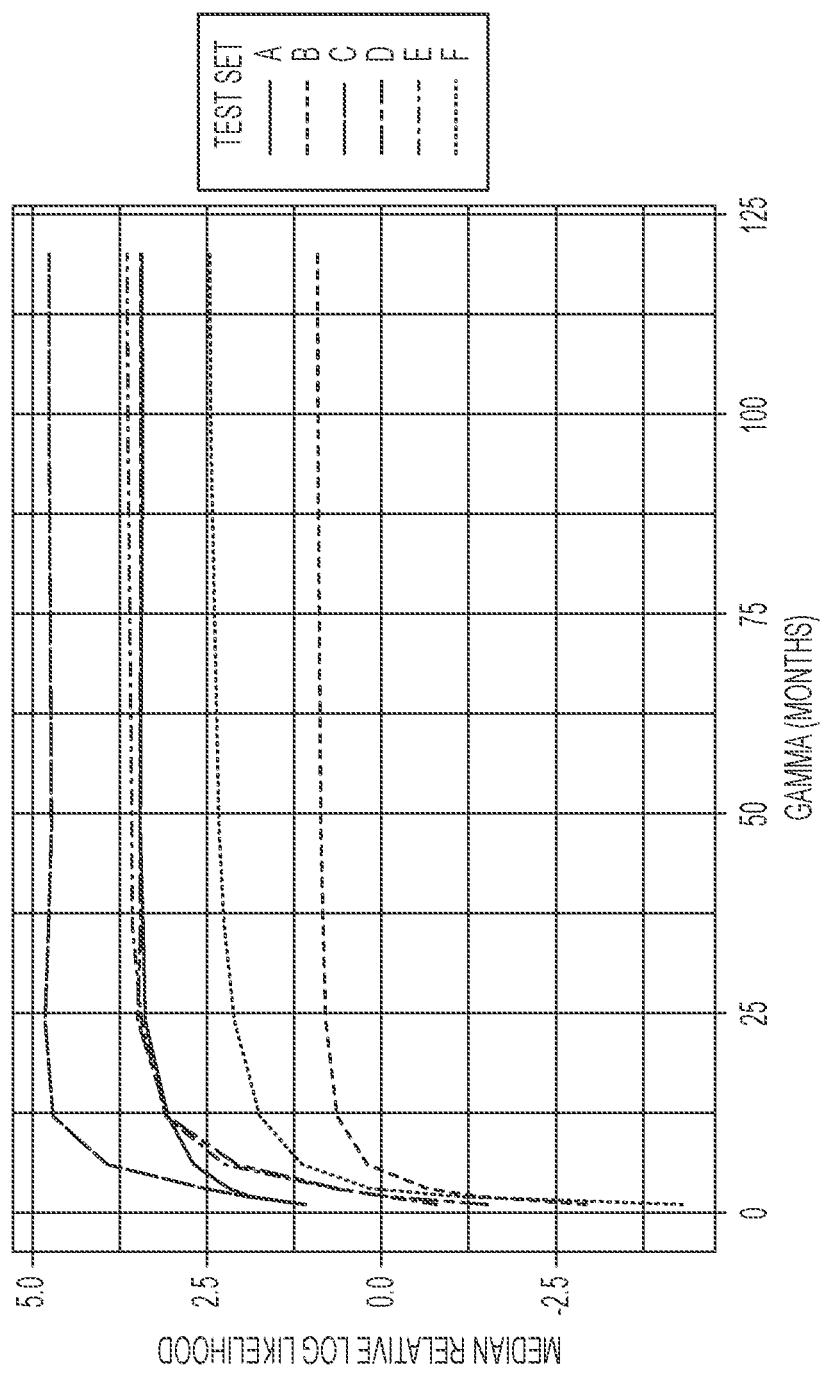
FIGS. 12A-12B show an example in one embodiment of user engagement timing preference performance.
Figure 12B:
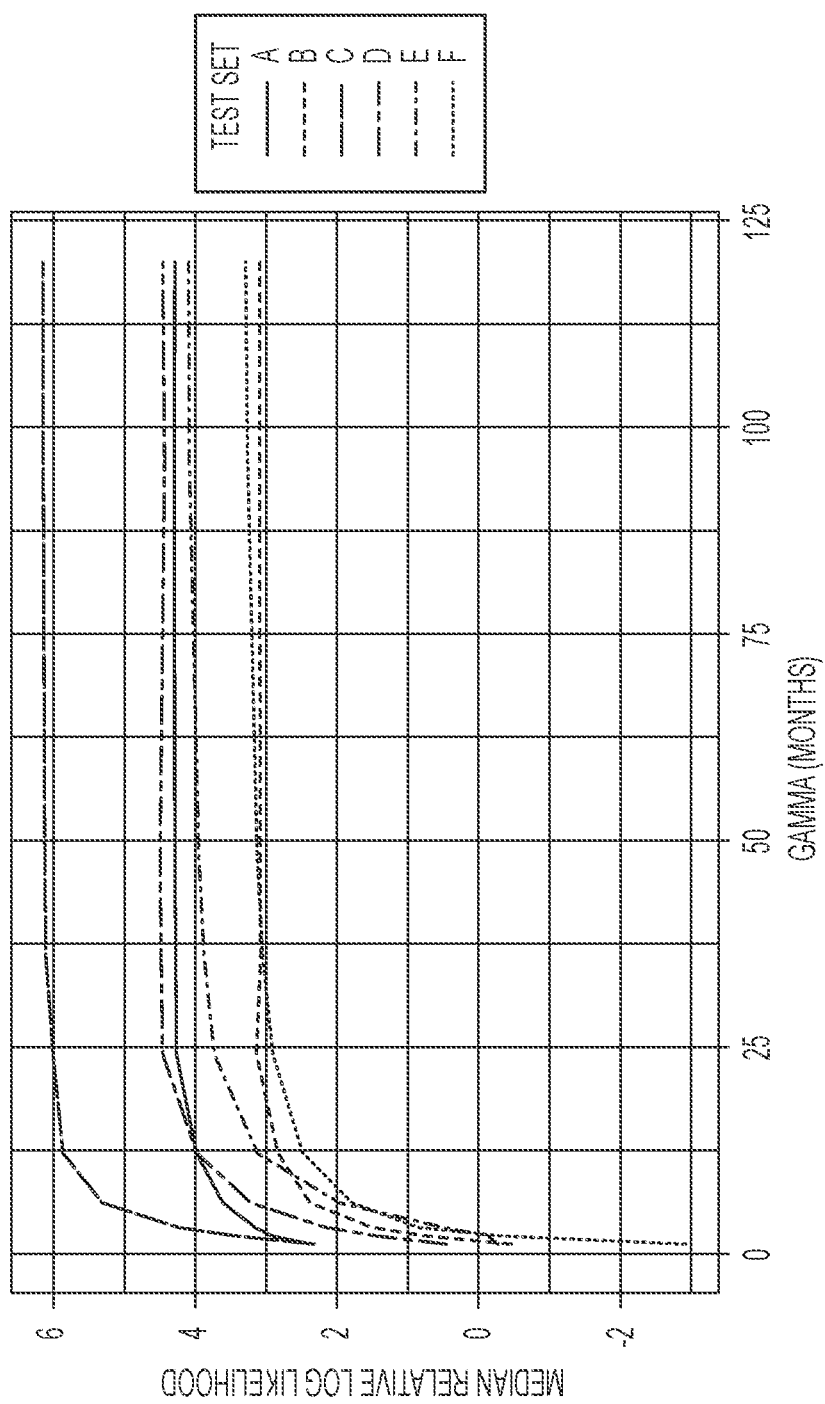

FIGS. 12A-12B show an example in one embodiment of user engagement timing preference performance. Comparisons are made at the user level in terms of the improvement of estimated likelihood given the user interactions during the test period, relative to a uniform model. The results show that, for n=3 (number of time bins), gamma=24 median relative log likelihood exceeds 0.80 for all users, approximately 2.2 times better than a uniform model. For n=4, gamma=24 median log likelihood exceeds 2.91 for all users—approximately 6.8 times better than a uniform model. The figures show the difference in log-likelihood compared to a naïve model which does not model any user preference (i.e., a uniform model which gives equal weight to all preference bins). The likelihood is a measure of how well the model captures the user behavior.

Figure 13:
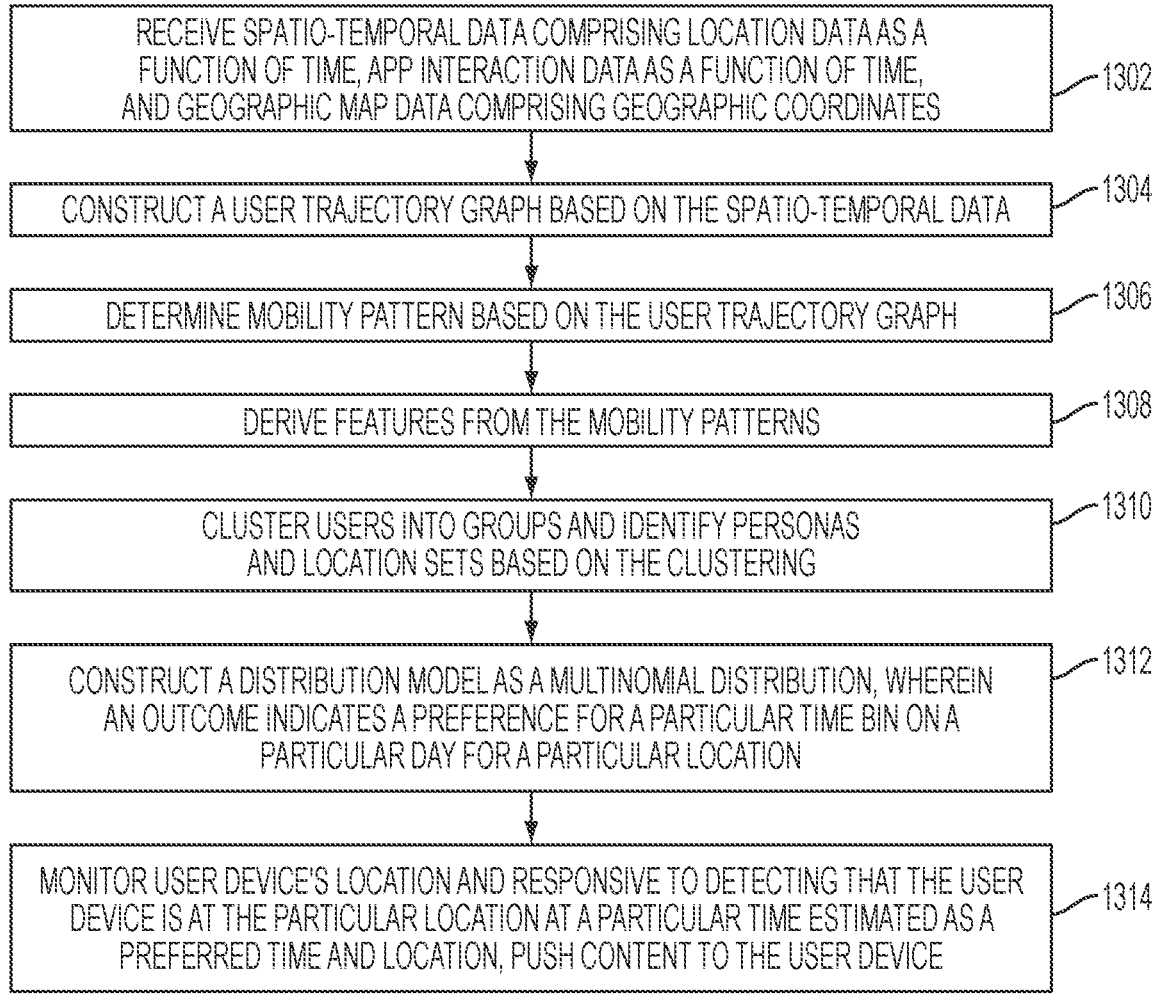
FIG. 13 is a flow diagram illustrating a method of the present disclosure in one embodiment.

FIG. 13 is a flow diagram illustrating a method of the present disclosure in one embodiment. At 1302, data is received. The data in one embodiment includes spatio-temporal data or location data as a function of time, app interaction data as a function of time, and geographic map data. Examples of location data as a function of time may include user's location (e.g., geographic coordinates), altitude, speed of travel, at given time. App interaction data as a function of time may include user's opening and closing of apps, for example, mobile apps, at given times. The geographic map data in one embodiment includes geographic coordinates.

At 1304, a trajectory graph is built to capture the sequence of locations visited along with location statistics and time information based on the received data. The trajectory graph may be built per user, e.g., for each user of the users that are being considered. In one embodiment, the graph is constructed incrementally by considering each location visited in a user's location stream. In one embodiment, locations are represented by nodes in the graph, nodes A and B have a directed edge from A to B if a visit to B follows a visit to A.

At 1306, given the trajectory graph, mobility pattern of a user is generated, for example, based on analyzing the trajectory graph. In one embodiment, the mobility pattern may be generated for each user. In one embodiment, generating a mobility pattern may include creating a user location-time signature. A user location-time signature may include an aggregate time over a period of time the user spent at a location at an hour of weekday and weekend day. Hours of the day may be grouped into n number of bins and the aggregate time may be specified in terms of the number of bins, for example, aggregate time spent during the hours falling into a bin, for each bin. This may be done for each of multiple locations. Examples are shown in FIG. 3 and FIGS. 4A-4C.

At 1308, features may be derived automatically from the mobility patterns. For instance, features may be extracted or derived from the user location-time signatures of all users being considered. Examples of features may include, but are not limited to, total number of unique locations visited; The number and type of unique locations visited in weekday and weekend routines, respectively; Stay time at user's home as a percentage of total stay time across all locations (for the period that is being considered); The average stay time at user's home; The number of visits to user's home; The average distance from home to other locations with direct visits, and other distance statistics (e.g., median, mean and standard deviation); The distance from home to work (e.g., only for weekday); The number and type of unique locations (and thereof, the average distance from home) that are only visited during weekdays; The number and type of unique locations (and thereof, the average distance from home) that are only visited during weekends.

At 1310, users may be clustered into groups, wherein the users in a same group possess similar feature values associated with the features, and the users in different groups have different feature values. Whether a feature value is similar or different may be determined based on meeting a threshold similarity. Clustering approaches such as K-means clustering and/or agglomerative clustering may be employed to perform the clustering in one embodiment. Feature extraction or derivation is also described with reference to FIGS. 9, and 10A and 10B. The clustering at 1310 identifies user personas and location sets. For example, an example of a persona may include characteristics of low mobility with low diversity of locations, high density and largest duration at its top location (e.g., home). Another example of a persona may include characteristics of high mobility with large diversity of locations, low density and shortest duration at its top location (e.g., home). Yet another example of a persona may include a characteristic of a medium level of mobility. Locations set may include locations that user is determined to have visited.

At 1312, engagement temporal and location preference is estimated based on the clustered persona and location sets, individual user history and aggregate population history associated with engagement time and location preference. For example, user timing preference may be modeled as a multinomial distribution where each outcome indicates preference for a particular time bin on a particular day for a particular location.

At 1314, based on the determined time of day and location, content may be automatically transmitted to a user responsive to detecting that a user, for example, user's mobile device is at the location at the time. For instance, user's mobile device location may be monitored and a signal received from the mobile device that indicates that the mobile device is at the particular location. If the mobile device is at the particular location at the particular time estimated as the preferred time and location, the content may be pushed to the mobile device.

Figure 14:
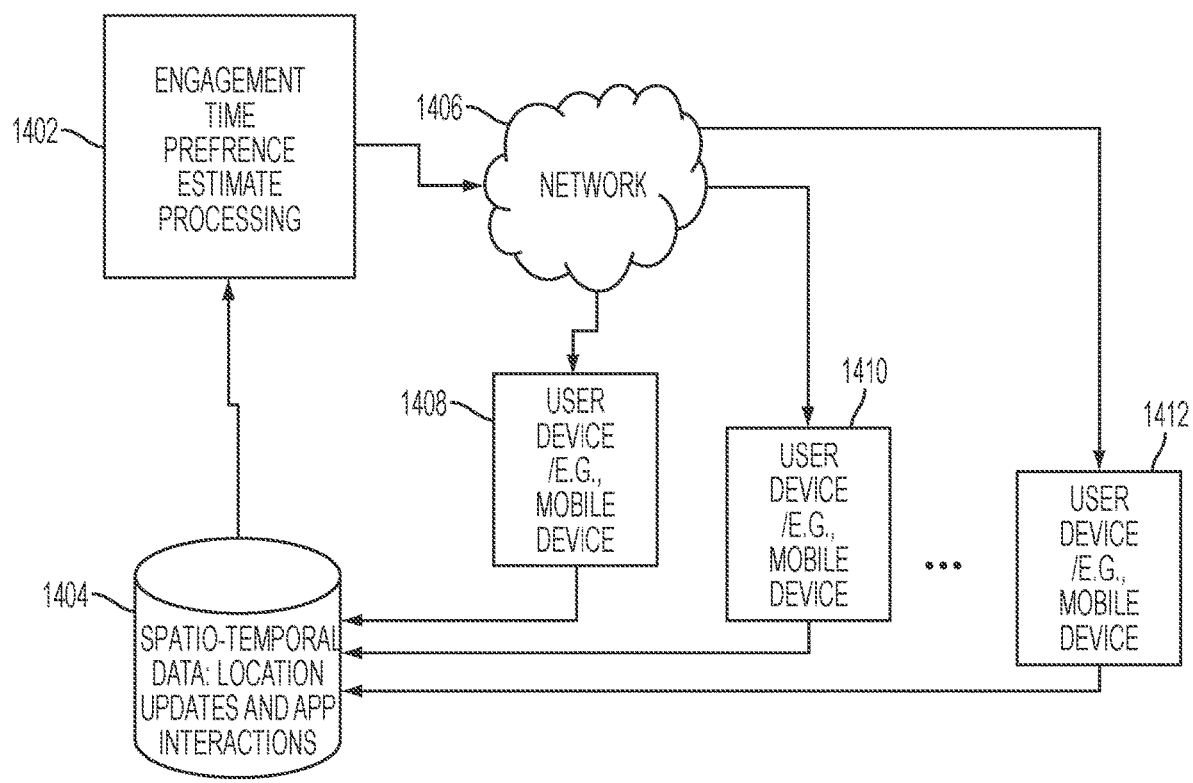
FIG. 14 illustrates an overview of a system in one embodiment of the present disclosure.

FIG. 14 illustrates an overview of a system in one embodiment of the present disclosure, for example, showing an autonomous system or control agent that automatically estimates engagement temporal and location preference estimation and pushes content to a user's device, e.g., a mobile device based on detecting that the user or the user's mobile device is at the location at the time. One or more processors 1402, for example, performing engagement temporal and location preference estimation, may receive spatio-temporal data comprising location data as a function of time, app interaction data as a function of time, and geographic map data comprising geographic coordinates, for example, from a database or storage device 1404. One or more of the processors may identify personas and location sets and construct a model where each outcome indicates a preference for a particular time bin on a particular day for a particular location as described above. For example, one or more of the processors 1402 may characterize users' personas based on their mobility patterns, and using both personas and mobility patterns, along with users' mobile app usage, one or more of the processors 1402 may determine the set of locations and times at which a user is more engaged.

In one embodiment, one or more of the processors 1402 may monitor user device (e.g., 1408, 1410, 1412) locations and responsive to detecting that a user device is at a particular location at a particular time estimated as a preferred time and location for that user, one or more of the processors 1402 may push content to the user device (e.g., one or more of 1408, 1410, 1412), for example, via a network 1406. The database or repository system 1404 may further continue to receive mobile device locations and times, app interactions and times, and update its information repository, e.g., location updates on mobile devices and mobile app interaction data, e.g., location update information in conjunction with app usage information for a specific app. In one embodiment, activity directly associated with a particular app may be employed to determine a users' general behavior. Based on the updates, one or more of the processors 1402 may further update the engagement temporal and location preference estimation model.

In one aspect, one or more of the processors 1402 may identify when a user is more likely to engage with a particular application on a mobile device. One or more of the processors 1402 may identify behaviors of individual users in relation to their engagement with particular mobile apps. The determination may take into account both the location trajectory behavior of users as well as their app interaction behavior across time. One or more of the processors 1402 may take as input user location information to compute the user trajectory graph that models a user's typical behavior. The trajectory graph may be combined with analysis of temporal preferences to understand the best time and place to interact with a user. In one aspect, one or more of the processors 1402 may create a clustering model for all users based on extracted user-location signatures. In one aspect, one or more of the processors 1402 may learn user profiles from user's tempo-spatial trajectory data using machine learning techniques. In one embodiment, users profiles learned and generated are dynamic and reflect users' interest up-to-date.

Figure 15:
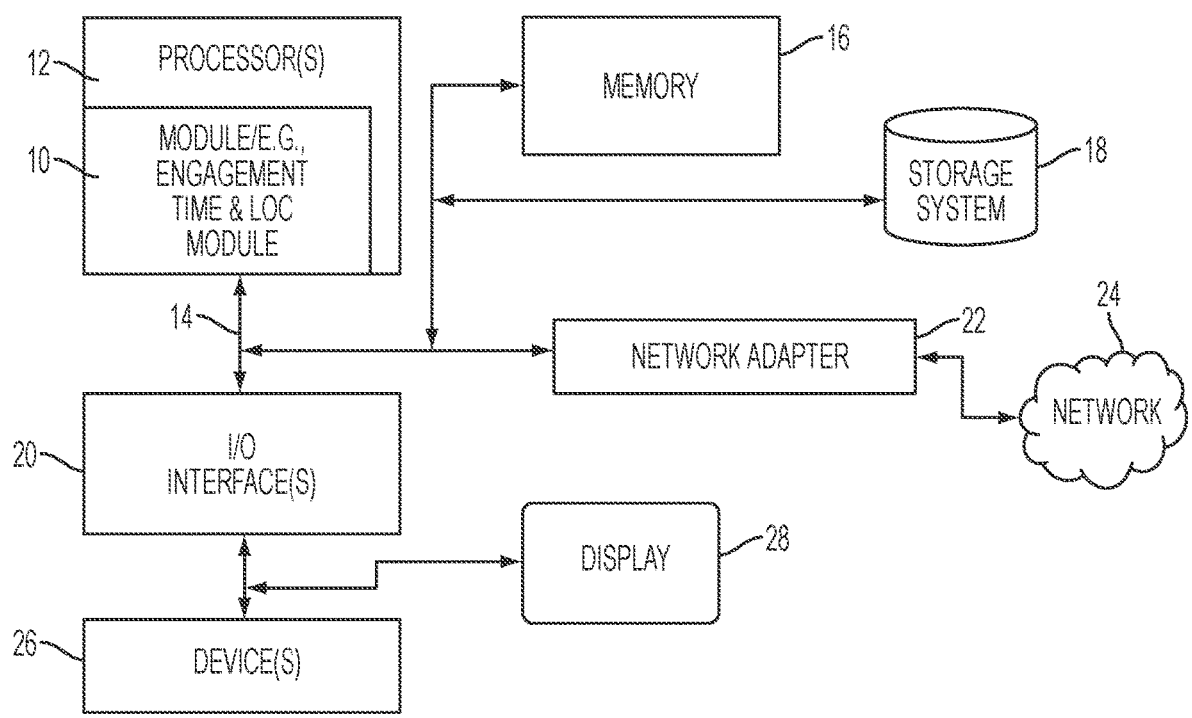
FIG. 15 illustrates a schematic of an example computer or processing system that may implement an engagement time and location preference system in one embodiment of the present disclosure.

FIG. 15 illustrates a schematic of an example computer or processing system that may implement an engagement time and location preference system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 15 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method to automatically determine user mobility behaviors and interaction preferences using spatio-temporal data and engage users, the method performed by a processor, comprising:
   receiving spatio-temporal data comprising location data as a function of time, app interaction data as a function of time, and geographic map data comprising geographic coordinates;
   constructing a user trajectory graph based on the spatio-temporal data;
   determining mobility patterns based on the user trajectory graph;
   deriving features from the mobility patterns;
   clustering users into groups of mobility levels, wherein the users in a same group have similar feature values associated with the features, and the users in different groups have different feature values, whether a feature value is similar or different determined based on meeting a similarity threshold, wherein cluster centroids are separated with unique signatures, wherein at least one cluster contains users with lower mobility, with lower diversity, and with largest duration at a location type compared to users in other clusters, and at least another cluster contains users with higher mobility, with larger diversity, and with shortest duration at the location type compared to users in other clusters;
   identifying personas and location sets based on the clustering, the personas including at least degrees of mobility during temporal units of time;
   constructing a distribution model, wherein an outcome indicates a preference for a particular time bin on a particular day for a particular location of a user engaging an app, wherein the distribution model uses bins with weights, the weights being updated based on recency of events mapped to the bins, wherein a bin is weighed based on an exponential function of a negative value of a time elapsed since an occurrence of an event mapped to the bin divided by a decay factor; and
   monitoring user device's location and responsive to detecting that the user device is at the particular location at a particular time estimated as a preferred time and location of the user engaging the app as indicated by the outcome, pushing content to the user device.

2. The method of claim 1, wherein the trajectory graph comprises nodes representing locations a user has visited and edges representing travel between the nodes, the edges having associated edge weights that indicate likelihood of the travel between the nodes, the nodes each having a node weight indicating frequency of visits to the respective nodes, wherein the trajectory graph is a directed cyclic graph, and the nodes comprise time duration labels.

3. The method of claim 1, wherein the features comprise user location-time signature comprising aggregated time spent at a given location and at time bins of weekday and weekend days.

4. The method of claim 3, wherein the time bins comprise hour bins representing groups of hours.

5. The method of claim 3, wherein the features further comprise:
   total number of unique locations visited;
   number and type of unique locations visited in weekday and weekend routines, respectively;
   stay time at user's home as a percentage of total stay time across all locations;
   average stay time at user's home;
   number of visits to user's home;
   average distance from home to other locations with direct visits;
   distance from home to work;
   number and type of the unique locations that are only visited during weekdays; and
   number and type of the unique locations that are only visited during weekends.

6. The method of claim 3, wherein the features are clustered to determine location types comprising at least home and work.

7. The method of claim 3, wherein the distribution model comprises at least one of a time-preference model indicating a preferred time and location for opening a mobile app.

8. A computer program product to automatically determine user mobility behaviors and interaction preferences using spatio-temporal data and engage users, the computer program product comprising a computer readable storage medium having program instructions embodied therewith, wherein the computer readable storage medium is not a transitory signal per se, the program instructions readable by a device to cause the device to perform a method comprising:
   receiving spatio-temporal data comprising location data as a function of time, app interaction data as a function of time, and geographic map data comprising geographic coordinates;
   constructing a user trajectory graph based on the spatio-temporal data;
   determining mobility patterns based on the user trajectory graph;
   deriving features from the mobility patterns;
   clustering users into groups of mobility levels, wherein the users in a same group have similar feature values associated with the features, and the users in different groups have different feature values, whether a feature value is similar or different determined based on meeting a similarity threshold, wherein cluster centroids are separated with unique signatures, wherein at least one cluster contains users with lower mobility, with lower diversity, and with largest duration at a location type compared to users in other clusters, and at least another cluster contains users with higher mobility, with larger diversity, and with shortest duration at the location type compared to users in other clusters;
   identifying personas and location sets based on the clustering, the personas including at least degrees of mobility during temporal units of time;
   constructing a distribution model, wherein an outcome indicates a preference for a particular time bin on a particular day for a particular location of a user engaging an app, wherein the distribution model uses bins with weights, the weights being updated based on recency of events mapped to the bins, wherein a bin is weighed based on an exponential function of a negative value of a time elapsed since an occurrence of an event mapped to the bin divided by a decay factor; and monitoring user device's location and responsive to detecting that the user device is at the particular location at a particular time estimated as a preferred time and location of the user engaging the app as indicated by the outcome, pushing content to the user device.

9. The computer program product of claim 8, wherein the trajectory graph comprises nodes representing locations a user has visited and edges representing travel between the nodes, the edges having associated edge weights that indicate likelihood of the travel between the nodes, the nodes each having a node weight indicating frequency of visits to the respective nodes, wherein the trajectory graph is a directed cyclic graph and the nodes comprise time duration labels.

10. The computer program product of claim 8, wherein the features comprise user location-time signature comprising aggregated time spent at a given location and at time bins of weekday and weekend days.

11. The computer program product of claim 10, wherein the time bins comprise hour bins representing groups of hours.

12. The program product of claim 10, wherein the features further include at least one of:
- total number of unique locations visited;
- number and type of unique locations visited in weekday and weekend routines, respectively;
- stay time at user's home as a percentage of total stay time across all locations;
- average stay time at user's home;
- number of visits to user's home;
- average distance from home to other locations with direct visits;
- distance from home to work;
- number and type of the unique locations that are only visited during weekdays; and
- number and type of the unique locations that are only visited during weekends.

13. The computer program product of claim 10, wherein the features are clustered to determine location types comprising at least home and work.

14. The computer program product of claim 10, wherein the distribution model comprises at least one of a time-preference model indicating a preferred time and location for opening a mobile app.

15. A system to automatically determine user mobility behaviors and interaction preferences using spatio-temporal data and engage users, comprising:
- a processor communicatively coupled to a storage device,
- the processor operable to receive spatio-temporal data comprising location data as a function of time, app interaction data as a function of time, and geographic map data comprising geographic coordinates from the storage device,
- the processor further operable to construct a user trajectory graph based on the spatio-temporal data,
- the processor further operable to determine mobility patterns based on the user trajectory graph,
- the processor further operable to derive features from the mobility patterns,
- the processor further operable to cluster users into groups of mobility levels, wherein the users in a same group have similar feature values associated with the features, and the users in different groups have different feature values, whether a feature value is similar or different determined based on meeting a similarity threshold, wherein cluster centroids are separated with unique signatures, wherein at least one cluster contains users with lower mobility, with lower diversity, and with largest duration at a location type compared to users in other clusters, and at least another cluster contains users with higher mobility, with larger diversity, and with shortest duration at the location type compared to users in other clusters,
- the processor further operable to identify personas and location sets based on the clustering, the personas including at least degrees of mobility during temporal units of time,
- the processor further operable to construct a distribution model, wherein an outcome indicates a preference for a particular time bin on a particular day for a particular location of a user engaging an app, wherein the distribution model uses bins with weights, the weights being updated based on recency of events mapped to the bins, wherein a bin is weighed based on an exponential function of a negative value of a time elapsed since an occurrence of an event mapped to the bin divided by a decay factor,
- the processor further operable to monitor user device's location and responsive to detecting that the user device is at the particular location at a particular time estimated as a preferred time and location of the user engaging the app as indicated by the outcome, the processor further operable to push content via a network to the user device.

16. The system of claim 15, wherein the trajectory graph comprises nodes representing locations a user has visited and edges representing travel between the nodes, the edges having associated edge weights that indicate likelihood of the travel between the nodes, the nodes each having a node weight indicating frequency of visits to the respective nodes, wherein the trajectory graph is a directed cyclic graph and wherein the nodes comprise time duration labels.

17. The system of claim 15, wherein the features comprise user location-time signature comprising aggregated time spent at a given location and at time bins of weekday and weekend days.

18. The system of claim 17, wherein the time bins comprise hour bins representing groups of hours.

19. The system of claim 15, wherein the features are clustered to determine location types comprising at least home and work.

20. The system of claim 15, wherein the distribution model comprises at least one of a time-preference model indicating a preferred time and location for opening a mobile app.

* * * * *